US006038357A

United States Patent [19]
Pan

[11] Patent Number: 6,038,357
[45] Date of Patent: Mar. 14, 2000

[54] PDM-WDM FOR FIBEROPTIC COMMUNICATION NETWORKS

[75] Inventor: Jing-Jong Pan, Milpitas, Calif.

[73] Assignee: E-Tek Dynamics, Inc, San Jose, Calif.

[21] Appl. No.: 09/018,207

[22] Filed: Feb. 3, 1998

[51] Int. Cl.[7] ................................................. G02B 6/27
[52] U.S. Cl. .............................. 385/24; 359/124; 385/11
[58] Field of Search .................................. 385/11, 39, 46, 385/24, 27, 28; 359/124, 125, 127

[56] References Cited

U.S. PATENT DOCUMENTS

| | | | |
|---|---|---|---|
| 5,504,609 | 4/1996 | Alexander et al. | 359/125 |
| 5,557,439 | 9/1996 | Alexander et al. | 359/130 |
| 5,559,910 | 9/1996 | Taga et al. | 385/24 |
| 5,589,969 | 12/1996 | Taga et al. | 359/124 |
| 5,651,080 | 7/1997 | Chu et al. | 385/28 |
| 5,673,342 | 9/1997 | Nelson et al. | 385/24 |
| 5,696,615 | 12/1997 | Alexander | 359/134 |
| 5,773,815 | 6/1998 | Stevens | 250/214 |
| 5,784,184 | 7/1998 | Alexander et al. | 359/125 |
| 5,793,508 | 8/1998 | Meli | 359/130 |
| 5,798,855 | 8/1998 | Alexander et al. | 359/177 |

OTHER PUBLICATIONS

Campos, L.A. "16–G/bits time– and polarization–division–multiplexed system using a novel compensation technique", OFC /94 Tech. Dig., pp. 14–15, 1994.

Evangelides et al., "Polarization Multiplexing with Solitons", IEEE J. of Lightwave Technology, Jan. 1992, pp. 28–35, Jan. 1992.

S.E. Evangelides, et al, "Polarization Multiplexing with Solitons," IEEE J. of Lightwave Technology, Jan. 1992, pp. 28–35.

I.M.I. Habbab and L.J. Cimini, "Polarization–Switching Techniques for Coherent Optical Communications," ibid, Oct. 1988, pp. 1537–1548.

S. Benedetto, et al., Multilevel Polarization Modulation Using a Specifically Designed LiNbO$_3$ Device, IEEE Photonic Tech. Lett., Aug. 1994, pp. 949–951.

E. Dietrich, et al., "Heterodyne Transmission of 560 Mbit/s Optical Signal by Means of Polarization Shift Keying," Electron. Lett. vol. 23, pp. 421–422, Apr. 1987.

R. Calvani, et al., "Polarization Phase–Shift keying: A Coherent Transmission Technique with Differential Heterodyne Detection," Electron. Lett. vol. 24, pp. 642–643, May 1988.

S. Betti, F. Curti, G.D. Marchis, and E. Iannone, "Phase Noise and Polarization State Insensitive Coherent Systems," J. of Lightwave Technology, vol. 8, pp. 756–767, Mar. 1990.

S. Benedetto and Poggiolini, "Theory of Polarization Shift Keying Modulations," IEEE Trans. on Comm., vol. 40, pp. 708–721, Apr. 1992.

S. Benedetto and Poggiolini, "Multilevel Polarization Shift Keying: Optimum Receiver Structure and Performance Evaluation" IEEE Trans. on Comm., Mar. 1994.

S. Betti, G.D. Marchis, and E. Iannone, "Polarization Modulated Direct Detection Optical Transmission Systems," J. of Lightwave Technol., vol 10, pp. 1985–1997, Dec. 1992.

S. Benedetto, et al., "L$_i$N$_b$O$_3$ modulator for binary and multilevel polarization modulation," OFC '94 Tech. Dig. pp. 286–287. (1994).

L.A. Campos, "16–Gbit/s time– and polarization–division–multiplexed system using a novel compensation technique," OFC '94 Tech. Dig., pp. 14–15. (1994).

(List continued on next page.)

*Primary Examiner*—John D. Lee
*Assistant Examiner*—Michelle R. Connelly-Cushwa
*Attorney, Agent, or Firm*—Townsend and Townsend and Crew LLP

[57] ABSTRACT

Polarization combiners and dividers are used in combination with WDM multiplexers and demultiplexers to create fiberoptic network systems with increased bandwidth and number of network users. Besides wavelength, the state of polarization of the optical signals creates different communication channels for the network system. The present invention is adaptable to many different fiberoptic network arrangements.

64 Claims, 16 Drawing Sheets

OTHER PUBLICATIONS

K. Iwatsuki et al., "60 Gb/s × 2 ch. Time/Polarization–Multiplexed Soliton Transmission Over 154 km Utilizing an Adiabatically compressed, Gain–Switched, DFB–LD Pulse Source," IEEE Photonics Tech. Lett., Nov. 1994, pp. 1377–1379.

S. Benedetto, et al., "Applications of Trellis Coding to Coherent Optical Communications Employing Polarization Shift Keying Modulation," Elect. Lett., vol. 27, No. 12, 1991, pp. 1061–1063.

C. Herard and A. Lacourt, "New Multiplexing Technique Using Polarization of Light, " Appl. Opt., vol. 30, No. 2, 1991, pp. 222–231.

P.M. Hill, et al., "Optical Polarization Division Multiplexing at 4 Gb/s," IEEE Photonics Tech. Lett., May 1992, pp. 500–502.

K. Iwatsuki, et al., "80 Gb/s Optical Soliton Transmission Over 80 km with Time/Polarization Division Multiplexing," IEEE Photonics Tech. Let., Feb. 1993, pp. 245–248.

A.S. Siddiqui and J. Zhou, "Two–Channel Optical Fiber Transmission Using Polarization Division Multiplexing," J. of Optical Communications, vol. 12, No. 2, 1991, pp. 47–79.

J.J. Pan, et al., "Endless Fiber–Optic Polarization Controller with Low Driving Voltage and 30–dB Extinction Ratio," OFC '94 Technical Digest, pp. 125–126, 1994.

K. Iversen, "Comparison and Classification of All–Optical CDMA for Tera–Bit Networks," IOOC 95, , WC3–5, pp. 96–97, 1995.

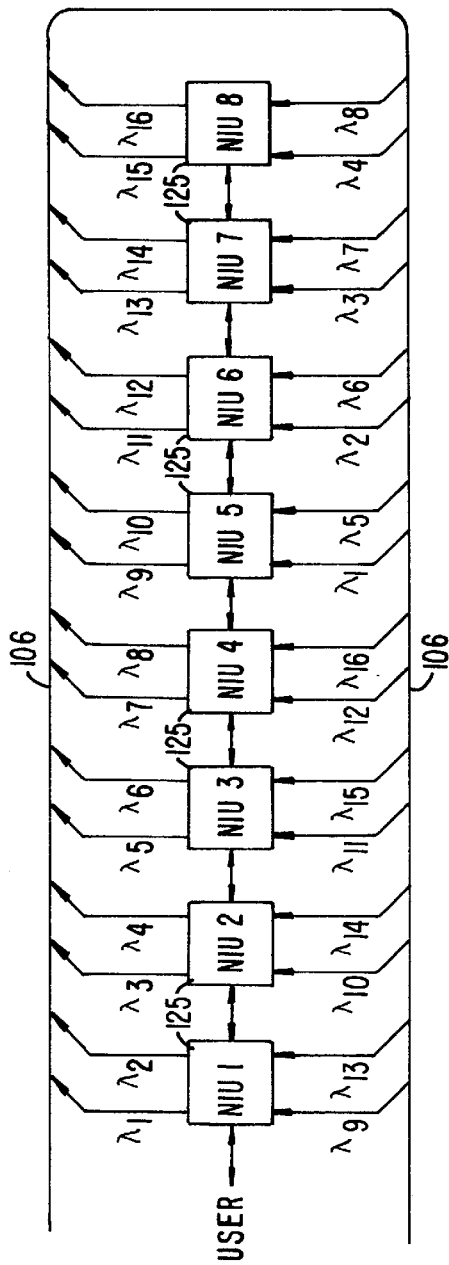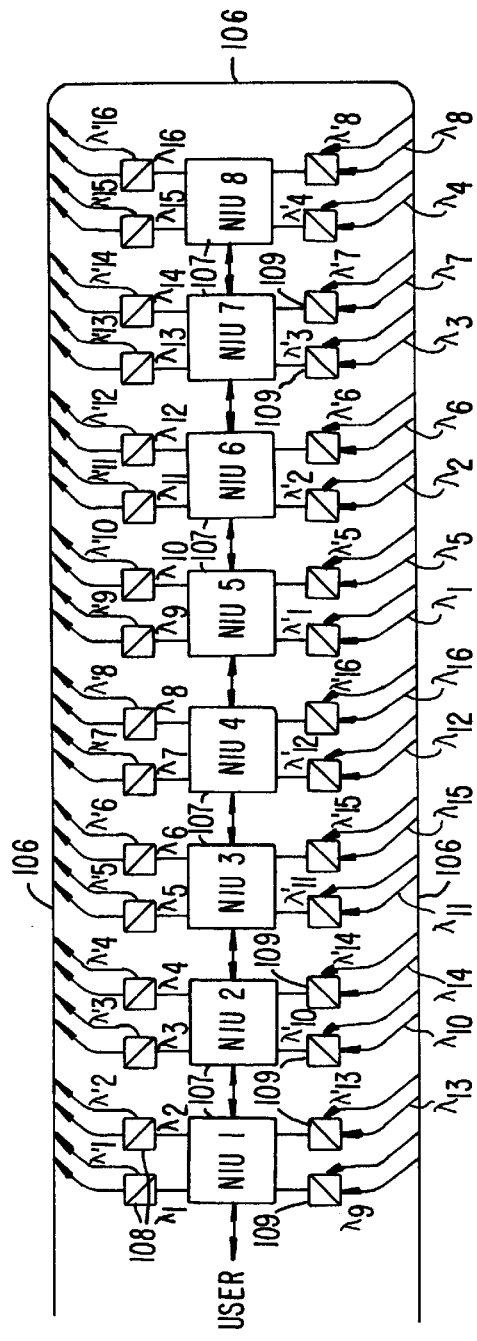
FIG. 10A.
FIG. 10B.

PDM-WDM FOR FIBEROPTIC COMMUNICATION NETWORKS

BACKGROUND OF THE INVENTION

The present invention is related to the field of fiberoptic systems and networks in which signals are directed from an optical source to a receiver by the state of polarization and the wavelength of the optical signal. Such systems and networks combine polarization-division multiplexing (PDM) and wavelength-division multiplexing (WDM) to increase the capacity, i.e., bandwidth, of the system or network for carrying information.

As modern telecommunication and data communication systems and networks have increasingly required more and more bandwidth, fiberoptic technology has come to the fore. One area of exploration has been the use of the state of polarization of a light signal to carry information. Lithium niobate ($LiNbO_3$) phase modulators and polarization controllers, and Pockels cells have been used to implement polarization phase-shift keying (POLSK). Other investigations have considered the polarization of signals in combination with time slots for different communication channels to propose polarization division multiplexing/time domain multiplexing communication systems.

However, for one reason or another, in recent years efforts to use the polarization of light signals have fallen into disfavor. Technologies, adapted from the electrical field, such as code division multiplexing (CDM), have been used in fiberoptic systems and networks. A purely optical technology, wavelength-division multiplexing (WDM), has become very popular. In a WDM system or network, the wavelength of an optical signal guides the signal from its source to its intended destination. To increase the bandwidth of such systems and networks, the so-called Dense WDM (DWDM) standard has been proposed. Under DWDM, the channel separation of signals is set at 0.8 nm in wavelength, or 100 GHz in frequency, so that more communication channels may be created.

Nonetheless, the transmission capacity of cost-effective CDM and WDM systems is limited, since the number of available channels is limited. For instance, it is expensive to select or produce laser diode sources at different wavelengths with the required characteristics in DWDM systems. Telecommunication and data communication systems are expected to require bandwidths of terabits per second, or even petrabits per second.

Hence, it is still highly desirable that the bandwidth of a communication system be increased and increased at reasonable cost. The present invention achieves this goal by utilizing the state of polarization of a light signal in WDM systems and networks. The present invention also permits an increase in the number of users for various types of fiberoptic network systems.

SUMMARY OF THE INVENTION

The present invention provides for a fiberoptic network system having a plurality of signal sources, a plurality of signal receivers, a plurality of optical fibers, and a plurality of devices interconnecting the signal sources and the signal receivers with the optical fibers. The interconnecting devices, such as polarization combiners and dividers, and WDM multiplexers and demultiplexers, direct signals from a signal source to a signal receiver responsive to a plurality of polarization states and wavelengths of the signals.

The present invention provides for various types of network systems having increased bandwidth and increased number of users.

BRIEF DESCRIPTION OF THE DRAWINGS

FIG. 10A is fiberoptic databus network system found in the prior art; FIGS. 10B and 10C are improved fiberoptic databus network systems, according to other embodiments of the present invention;

DETAILED DESCRIPTION OF SPECIFIC EMBODIMENTS

In accordance with the present invention, the channel-carrying capacity of a conventional WDM network system is significantly increased. For example, in a typical WDM system with N communication channels, there are N signal sources, each transmitting optical signals at one of N wavelengths and N signal receivers, each receiving optical signals at one of the N wavelengths. The present invention effectively multiplies the number of communication channels in such WDM systems.

Figure 1A:
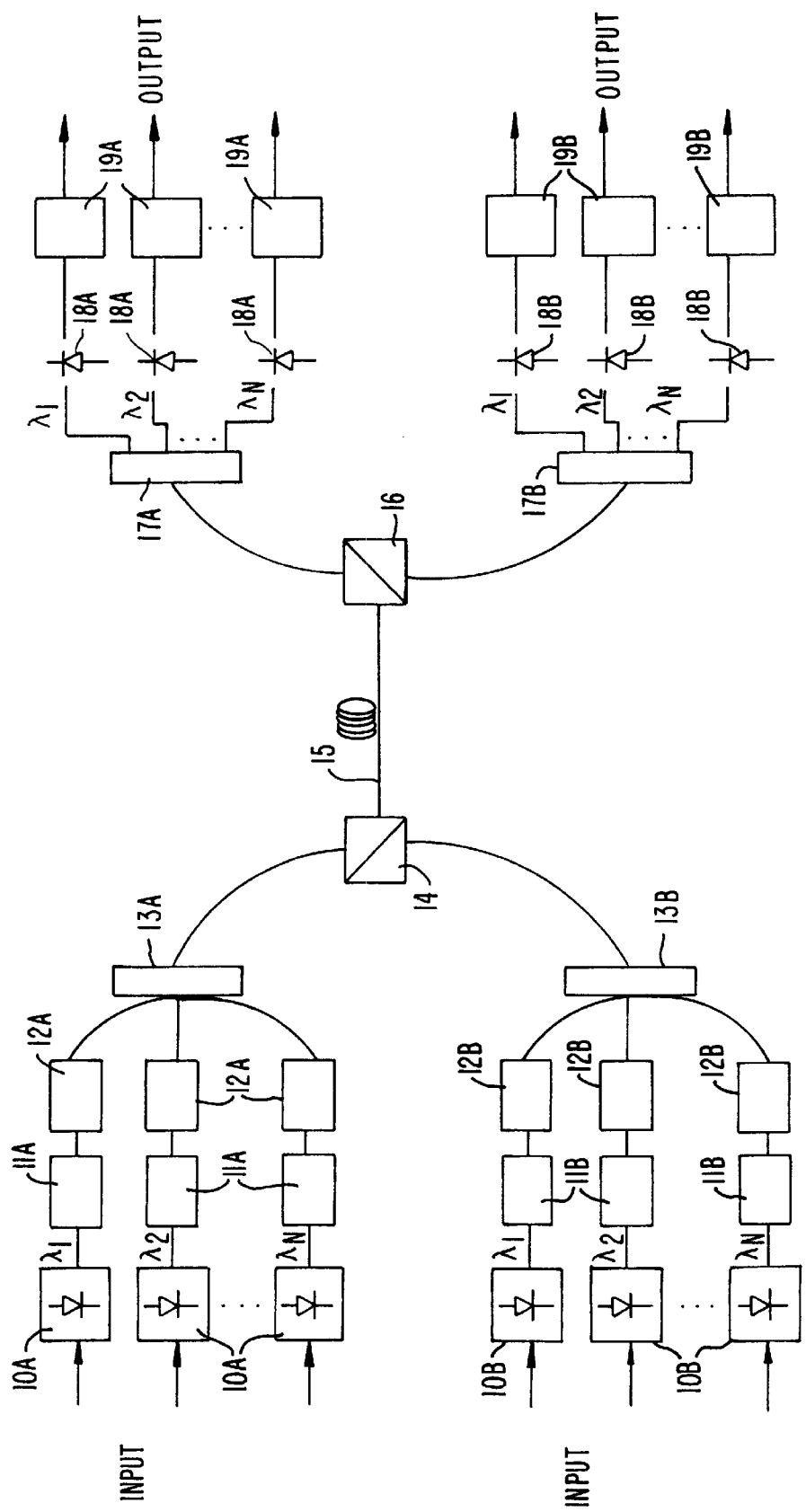
FIG. 1A is a block diagram of a two-state polarization PDM-WDM system with directly modulated input, according to one embodiment of the present invention.

In accordance with one embodiment of the present invention, the PDM-WDM system of FIG. 1A doubles the number of channels over a conventional WDM system. The FIG. 1 system has one set of N network signal sources, laser diode sources 10A, each of which is connected to a variable attenuator 11A. The variable attenuator 11A is, in turn, connected to a polarization controller 12A. The output of each polarization controller 12A is sent to a WDM multiplexer 13A. Similarly, another set of N network signal sources, laser diode sources 10B, are each connected to a variable attenuator 11B which, in turn, is connected to a polarization controller 12B. The output of each polarization controller 12B is sent to a WDM multiplexer 13B. The output signals of both WDM multiplexers 13A and 13B are combined by a polarization combiner 14 and sent to a transmission optical fiber 15, which carries the signals from all the laser sources 10A and 10B.

The optical fiber 15 is connected to a polarization divider 16, which is connected to two WDM demultiplexers 17A and 17B. The demultiplexer 17A is connected to one set of N network receivers, each formed by a photodiode 18A and an electronic unit 19A. The demultiplexer 17B is connected to another set of N network receivers, each network receiver formed by a photodiode 18B and an electronic unit 19B.

The network system operates with N wavelengths, $\lambda_1$–$\lambda_N$, and two polarization states to double the number of communication channels. Each polarization state is linear and preferably, perpendicular to the other polarization state. Each of the N laser diode sources 10A has an output at one of the wavelengths, $\lambda_1$–$\lambda_N$. Likewise, each of the N laser diode sources 10B has a corresponding output wavelength, $\lambda_1$–$\lambda_N$. The polarization controllers 12A ensure that the signals from the sources 10A are in one linear polarization state and the polarization controllers 12B ensure that the signals from the sources 10B are in the other linear polarization state. A light signal from, say, a laser source 10A at $\lambda_i$ has its intensity equalized by the corresponding attenuator 11A and its state of polarization adjusted by the corresponding polarization controller 12A into the first polarization state. Similarly, the polarization controllers 12B ensure that all of the light signals from the laser sources 10B are placed into the other polarization state. The light signals from the exemplary laser source 10A are combined with the signals from the other laser sources 10A (but with other output wavelengths $\lambda_1 \ldots \lambda_{i-1}, \lambda_{i+1}, \ldots \lambda_N$) by the WDM multiplexer 13A and passed on the polarization combiner 14. The polarization combiner 14 also receives the signals from the other laser sources 10B with wavelengths $\lambda_1$–$\lambda_N$, but in the second polarization state.

After passing through the optical fiber 15, the optical signals are separated by their polarization states, the signals in the first polarization state being directed toward, say, the WDM demultiplexer 17A and signals in the second polarization state toward the WDM demultiplexer 17B. The demultiplexers 17A and 17B separate the optical signals according to their wavelengths and transmit them to their respective receivers. Alternatively, the demultiplexers 17A and 17B may indiscriminately transmit the signals to all their receivers and let the receivers filter out the undesired wavelengths. The receivers, each formed by a photodiode 18A(18B) and associated electronic unit 19A(19B), convert the received optical signals into electrical ones. The photodiode 18A(18B) generates an electrical signal in response to the received light signal, and the associated electronic unit 19A(19B) conditions the electrical signal for operation in the receivers' electronic circuits.

Hence, with the same number of signal wavelengths, N, in a conventional WDM system, the number of communication channels is increased with the present invention. In the embodiment of FIG. 1A, the number is doubled to 2N communication channels.

A laser source, say, source 10A, generates an output signal at an exemplary wavelength $\lambda_i$, one of the wavelengths $\lambda_1$–$\lambda_N$. The attenuator 11A which receives the output signal operates to equalize the output strengths of the optical signal to the strengths of the output signals being generated in the network system. The output signal from the source 10A is rotated by the connected polarization controller 12A. It should be observed that polarization controllers are placed even in a conventional WDM system to control second-order effects, such as four-wave mixing, in the network system.

WDM multiplexers and demultiplexers, which might be useful in the described network system above (and systems described below) are described in related U.S. Pat. No. 5,642,447, entitled "FIBER OPTIC NETWORK TRANSMISSION SYSTEM WITH INTEGRATED OPTICAL ISOLATOR COUPLERS," which issued on Jun. 24, 1997 to J. J. Pan et al.; and U.S. Pat. No. 5,652,814, entitled "INTEGRABLE FIBEROPTIC COUPLER AND RESULTING DEVICES AND SYSTEMS," which issued on Jul. 29, 1997 to J. J. Pan et al. Both patents are assigned to the present assignee.

Figure 1B:
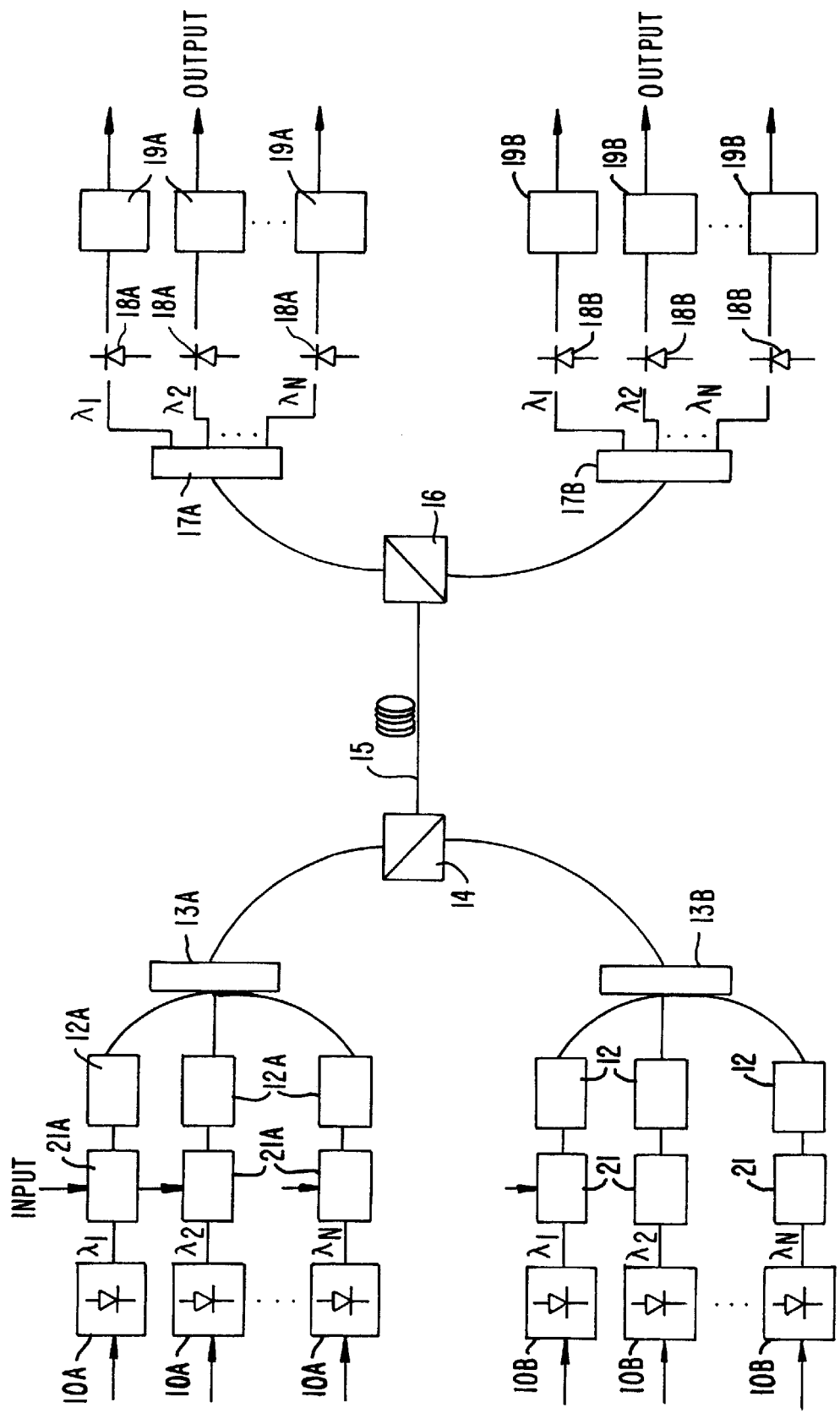
FIG. 1B is a variation of the PDM-WDM system of FIG. 1A in which externally modulated inputs.

In the FIG. 1A system, the laser diode sources 10A and 10B are directly modulated by the electronic input signals. In other words, electrical input signals (indicated by arrows to the sources 10A and 10B) turn the laser diode sources 10A and 10B on and off to create the optical digital signals which travel through the network system. FIG. 1B illustrates a variation of the FIG. 1A system. In the FIG. 1B system, the laser diode sources 10A and 10B are not modulated, rather the output signals from the sources are modulated by modulators 21A and 21B in response to electrical input signals (indicated by arrows to the modulators 21A and 21B). The modulators 21A and 21B may be EOM (electrooptical modulator) or EAM (electroabsorbtive modulator) types.

Figure 2:
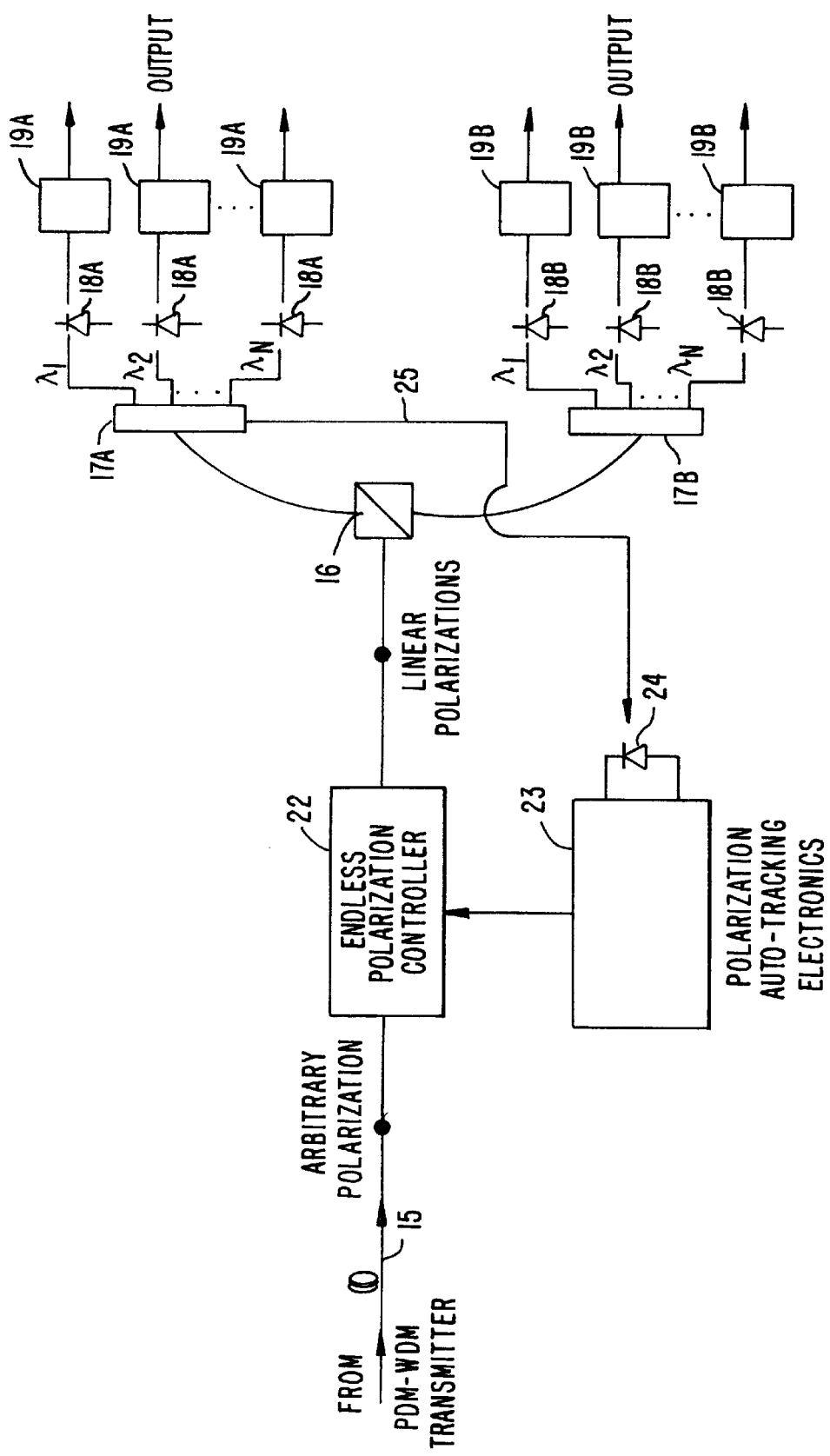
FIG. 2 is a block diagram of an endless polarization controller of the systems illustrated in FIGS. 1A and 1B.

FIG. 2 illustrates a component block of the FIG. 1A and 1B network systems, which is not shown in those drawings. In these network systems, an endless polarization controller 22 and a polarization auto-tracking block 23 are used to control the state of polarization of the optical signals being sent over the optical fiber 15. The controller 22 is connected to the transmission optical fiber 15 at a node before the optical signals reach the polarization divider 16. The endless polarization controller 22 rotates the polarization of the optical signals on the fiber 15 according to control signals from a feedback loop formed, in this case, by the WDM demultiplexer 17A, a feedback optical fiber 25, a photodiode 24, and the polarization auto-tracking block 23. The WDM demultiplexer 17A receives the optical signals in the first polarization state. Part of these signals are sent by the optical fiber 25 to the photodiode 24, which generates an electrical signal proportional to the strength (intensity) of the signals in the first polarization state. The electrical signal from the photodiode 24 is received by the block 23 which, in turn, controls the endless polarization controller 22. Hence, once the first polarization state is determined, the polarization auto-tracking block 23 locks into the first polarization state and rotates the optical signals in the fiber 15 as required to optimize the strength of the first polarization state signals carried on the fiber 25 to the photodiode 24 and block 23. Many types of endless polarization controller devices might be used for the unit 22. U.S. Pat. No. 5,276,747, entitled "POLARIZATION-INDEPENDENT OPTICAL SWITCH/ATTENUATOR," which issued Jan. 4, 1994 to J. J. Pan and assigned to the present assignee, and an article, "Endless fiber-optic polarization controller with low driving voltage and 30-dB extinction ratio," by J. J. Pan, Z. M. Liu, Q. Y. Li, *Optical Fiber Conference '94 Technical Digest*, pp. 125–126, disclose details for an endless polarization controller which is particularly adaptable for the described network systems above.

Figure 3A:
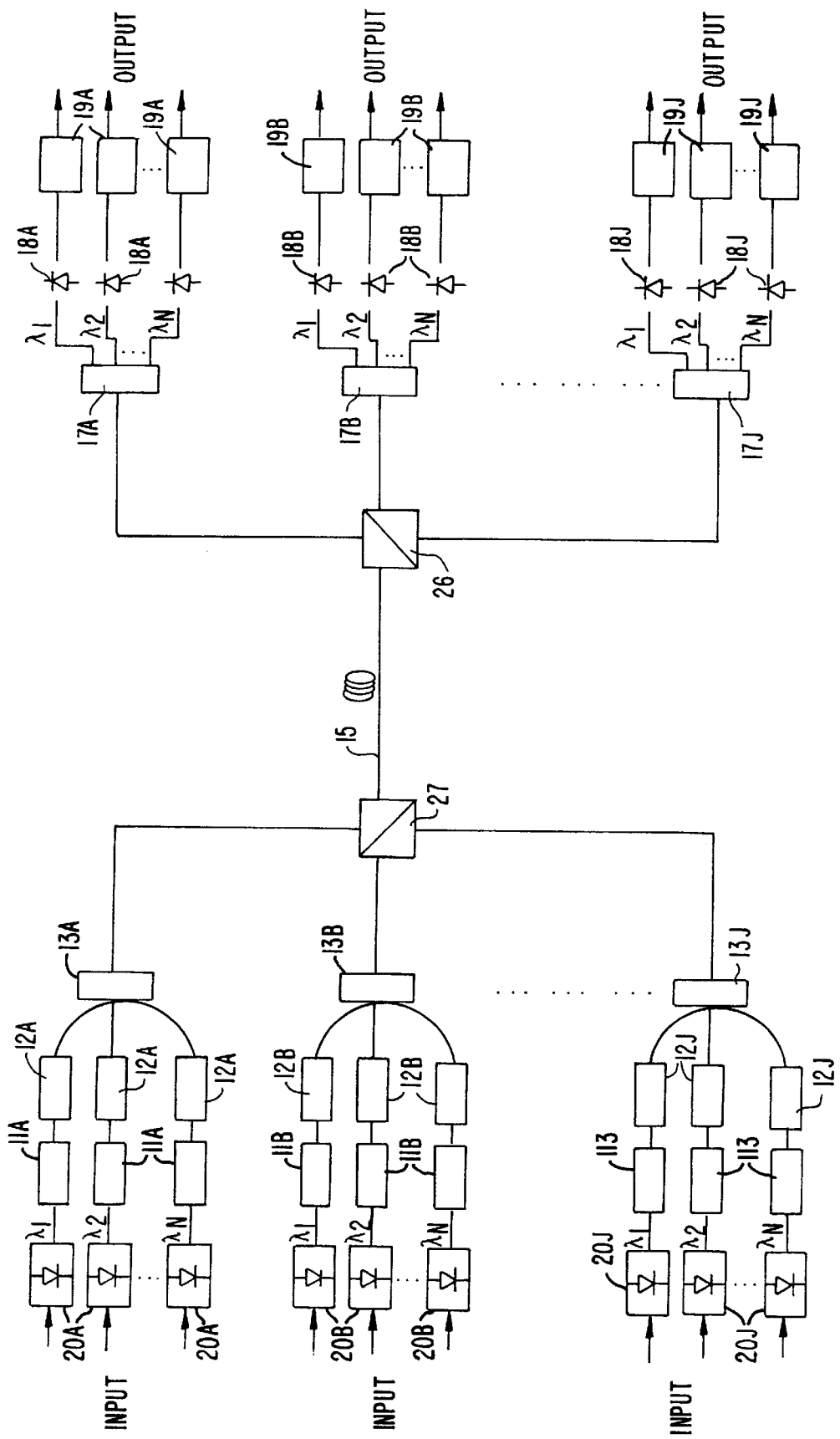
FIG. 3A is a block diagram of a multistate polarization PDM-WDM system with directly modulated input, according to another embodiment of the present invention.
Figure 3B:
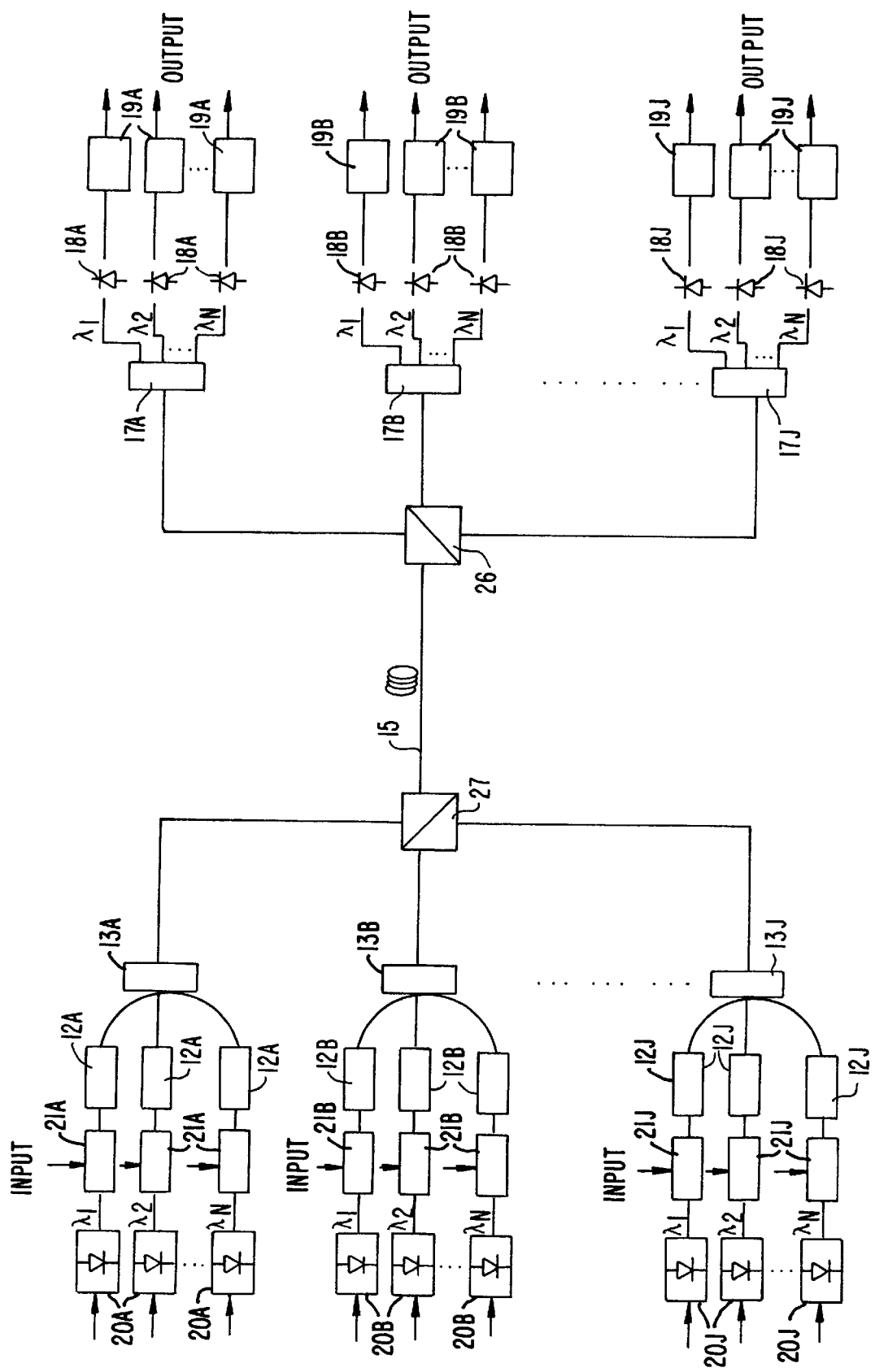
FIG. 3B is a variation of the PDM-WDM system of FIG. 3A with externally modulated inputs.

The FIG. 1A and 1B network systems use two linear polarization states. FIGS. 3A and 3B discloses more complex systems in which more than two, i.e., J, polarization states are used to increase the transportation capacity of the systems. J sets of laser diode sources 20A–20J with each set of N laser sources. Hence the number of communication channels is J×N. Likewise, the FIG. 3B system is similar to the FIG. 3A system in which the laser diode sources 20A–20J are directly modulated. In the FIG. 3B system, the network source signals are modulated by the modulators 21A–21J, as in the case of the FIG. 1B system. As in FIGS. 1A and 1B, the systems of FIGS. 3A and 3B each include a polarization combiner 27 for combining output signals of WDM multiplexers 13A–13J and a polarization divider 26 for dividing signals to WDM demultiplexers 17A–17J. Though not shown, it should be understood that an endless polarizer, such as illustrated in FIG. 2, is also part of the FIGS. 3A and 3B systems. As described above, the network systems have endless polarization controllers and polarization auto-tracking blocks to control the state of polarization of the optical signals being sent over the transmission fiber 15. The endless polarization controllers and polarization auto-tracking blocks are not shown in FIGS. 3A and 3B.

Figure 4:
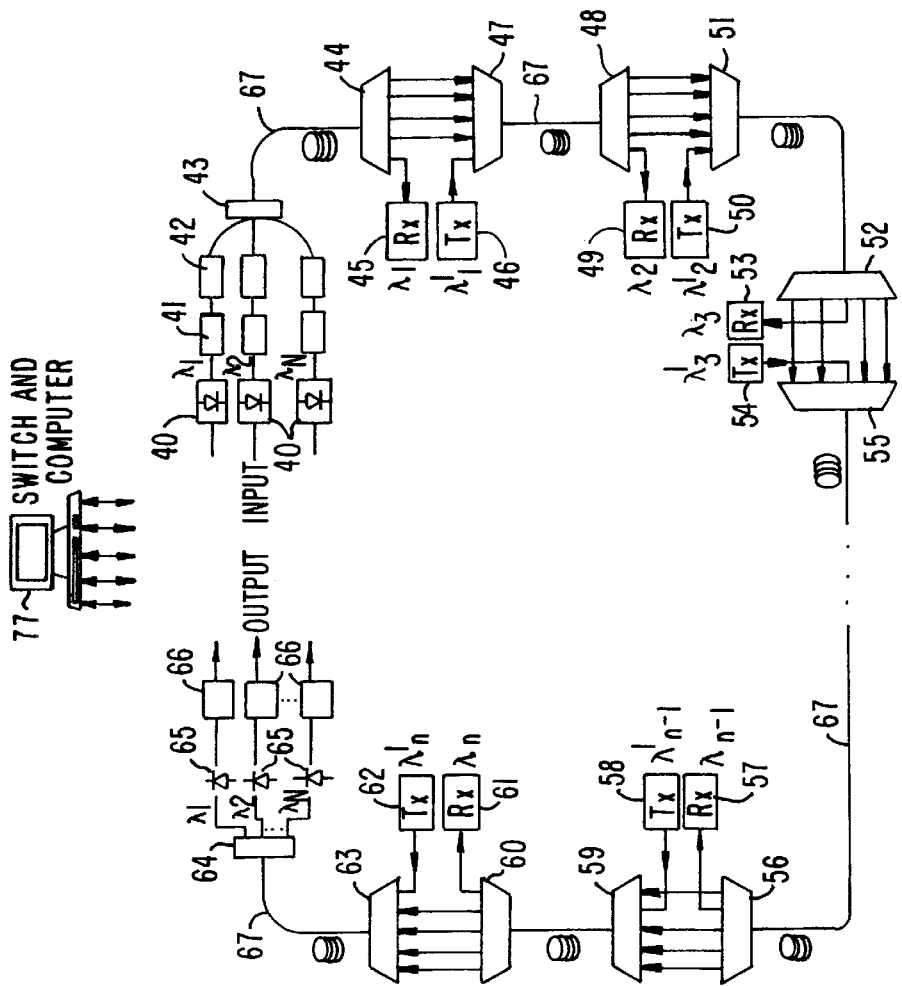
FIG. 4 is a block diagram of a conventional WDM ring network with add/drop multiplexers/demultiplexer combinations.

The present invention is adaptable to conventional WDM ring networks, of which FIG. 4 is an illustration. Such networks have a switch and computer 77, which provides access into, and egress out of, the network. The network has N laser sources 40 which are responsive to input signals from the switch/computer 77. Each of the laser sources 40 has a different output wavelength $\lambda_1$–$\lambda_N$. The output intensity of each laser 40 is equalized by an attenuator 41 and the attenuated optical signal is rotated by polarization controller 42. The optical signals at all these wavelengths are combined by a multiplexer 43 to be carried by a transmission optical fiber 67.

A WDM demultiplexer and WDM multiplexer forms each add/drop node on the optical fiber 67. For example, the first add/drop node is formed by a WDM demultiplexer 44, which separates out a wavelength $\lambda_1$ and passes that optical signal to a receiver (Rx) 45. The receiver is formed by a photodiode, which generates an electrical signal in response to the received light signal, and associated electronic unit, which conditions the electrical signal for operation in the receiver's electronic circuits, as described above with respect to FIGS. 1A and 1B. The first add/drop node also has a WDM multiplexer 47 which accepts the optical signals, $\lambda_2$–$\lambda_N$, not separated out by the WDM demultiplexer 44 and an optical signal at wavelength $\lambda_1$ from a transmitter (Tx) 46. The transmitter is formed by a laser source (and attenuator and polarization controller) having an output wavelength $\lambda_1$ and which is responsive to electrical input signals at the first node. The WDM multiplexer 47 combines all these signals at wavelengths $\lambda_1$–$\lambda_N$ for the transmission fiber 67 to the next add/drop node. The second add/drop node separates out and inserts optical signals at wavelength $\lambda_2$, and so forth. FIG. 4 shows a plurality of WDM demultiplexers 44, 48, 52, 56, 60; a plurality of WDM multiplexers 47, 51, 55, 59, 63; a plurality of receivers 45, 49, 53, 57, 61; and a plurality of transmitters 46, 50, 54, 58, 62.

The output of the multiplexer 63 of the last add/drop node is connected to a WDM demultiplexer 64, which separates the combined optical signals into the separate wavelengths. The signals at each wavelength are translated into electrical signals by N photodiodes 65. The electrical signals of each wavelength are received by one of N electrical units 66 and passed to the switch/computer 77.

Figure 5A:
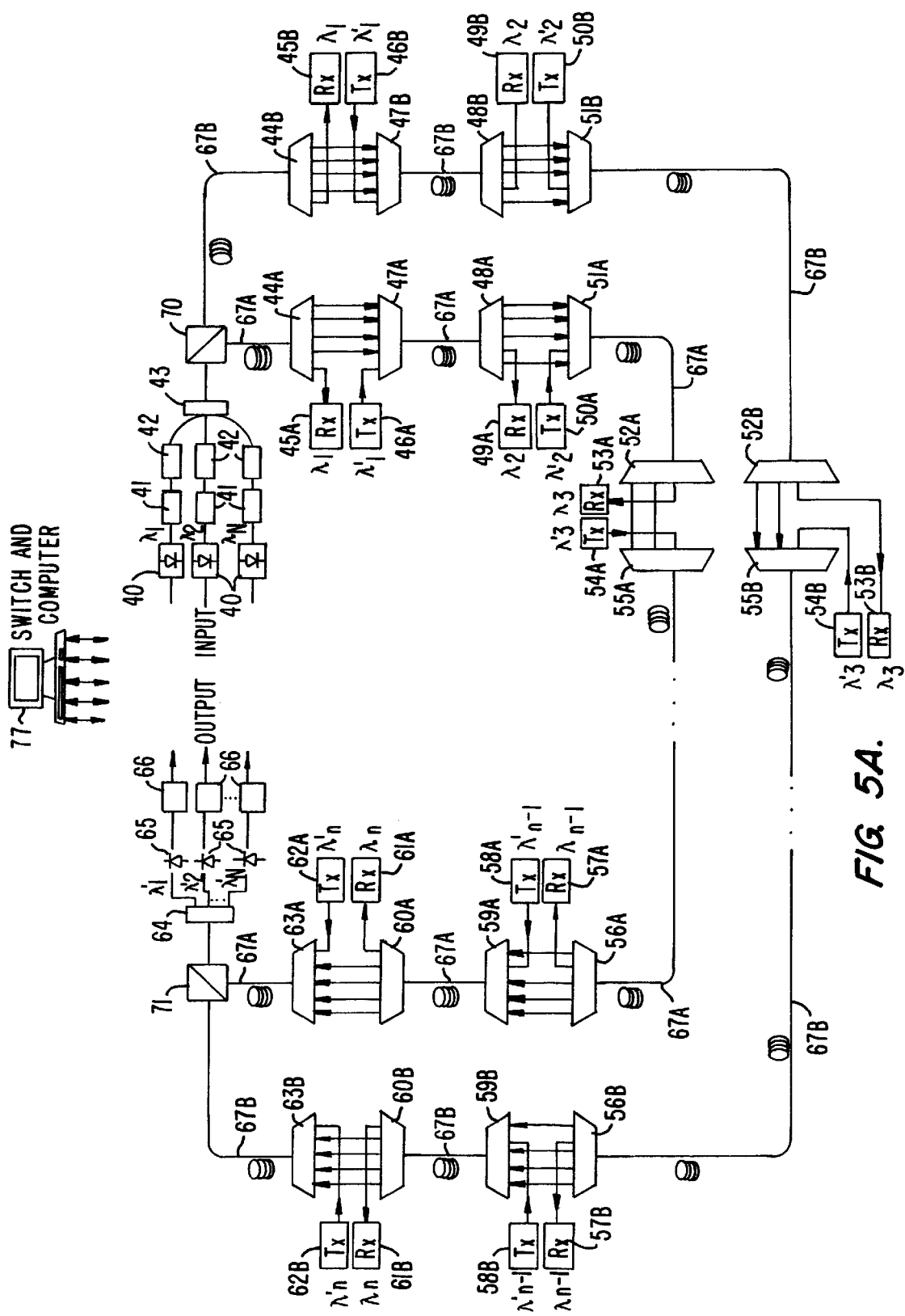
FIG. 5A is a block diagram of a PDM/WDM ring network with add/drop multiplexers/demultiplexer combinations, according to another embodiment of the present invention.

The present invention can also increase the add/drop nodes of such ring networks. FIG. 5A shows such an embodiment of the present invention. The FIG. 5A system has two rings created by optical fibers 67A and 67B, each fiber having N add/drop nodes. Each optical fiber 67A and 67B carries optical signals of one polarization state or another. The laser sources 40, each in response to an input signal received from the switch/computer 77, generates the optical signals, which are equalized by the variable attenuators 41, as described previously. Depending upon the destination of the optical signals, the polarization controllers 42 rotate the optical signals into the first polarization state or the second. All the signals at the different wavelengths $\lambda_1$–$\lambda_N$ and polarization states are combined by the WDM multiplexer 43. After the WDM multiplexer 43, a polarization divider 70 separates the optical signals according to their polarization states. Signals in the first polarization state are transmitted to optical fiber 67A, say, and signals in the second polarization state are transmitted to the optical fiber 67B. The add/drop nodes are each formed and operate, as described above with respect to a conventional WDM ring network. The optical signals in both rings are sent to a polarization combiner 71 which then sends the optical signals in both polarization states to the WDM demultiplexer 64 and its connected receivers. FIG. 5A shows a plurality of WDM demultiplexers 44A, 48A, 52A, 56A, 60A; a plurality of WDM multiplexers 47A, 51A, 55A, 59A, 63A; a plurality of receivers 45A, 49A, 53A, 57A, 61A; and a plurality of transmitters 46A, 50A, 54A, 58A, 62A in the first optical fiber 67A. FIG. 5A further shows a plurality of WDM demultiplexers 44B, 48B, 52B, 56B, 60B; a plurality of WDM multiplexers 47B, 51B, 55B, 59B, 63B; a plurality of receivers 45B, 49B, 53B, 57B, 61B; and a plurality of transmitters 46B, 50B, 54B, 58B, 62B in the second optical fiber 67B.

Note that the number of communication channels is not increased in the FIG. 5A network system, only the number of add/drop nodes. The communication channels are still dependent upon the particular wavelength $\lambda_1$–$\lambda_N$, but the number of access ports into the network is doubled.

Figure 5B:
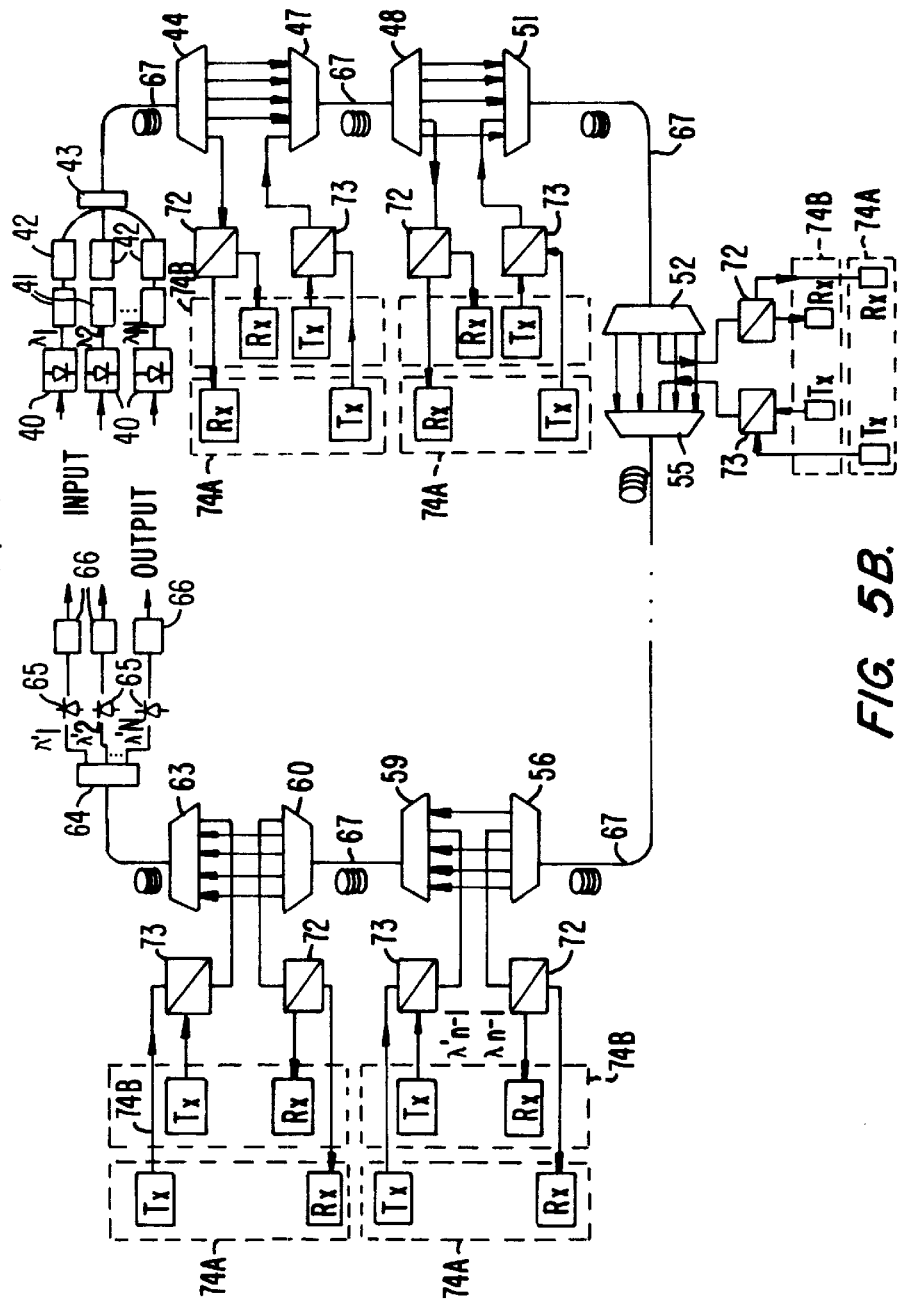
FIG. 5B is a block diagram of another PDM/WDM ring network with add/drop multiplexers/demultiplexer combinations and directly modulated input, according to still another embodiment of the present invention.

An alternative to the FIG. 5A network is the network of FIG. 5B, in which the single ring configuration of the conventional WDM ring network is preserved. However, like the FIG. 5A network, the polarization controllers 42 also operate to place the optical signals from the laser sources 40 in a first or second polarization state. The combined signals at all wavelengths $\lambda_1$–$\lambda_N$ and both polarization states are transmitted on the optical fiber 67. Each add/drop node is formed by the demultiplexer/multiplexer combination described with respect to the conventional FIG. 4 network. However, the receivers and transmitters of the FIG. 5B network have been modified to discriminate between the two polarization states.

Each add/drop node is connected to a pair of receiver/transmitter units 74A and 74B illustrated by dotted lines. Each receiver/transmitter unit 74A or 74B has a receiver (labeled "Rx" in the drawings) which receives signals from optical fiber 67 through a polarization divider 72, and a transmitter (labeled "Tx" in the drawings) which transmits signals to the optical fiber 67 through a polarization combiner 73. For example, the second add/drop node has a WDM demultiplexer 48 and a WDM multiplexer 51. The WDM demultiplexer 48 separates signals at wavelength $\lambda_2$ and transmits the $\lambda_2$ signals to the polarization divider 72. The optical signals at the remaining wavelengths, $\lambda_1$ and $\lambda_3$–$\lambda_N$, are passed to the WDM multiplexer 51 and on to the next add/drop node on the optical fiber 67. With respect to the signals at $\lambda_2$, the polarization divider 72 sends the signals to the first receiver/transmitter 74A or the second receiver/transmitter 74B depending upon the polarization state of the signals. As explained above, the receiver of the unit 74A or 74B changes the optical signals from the polarization divider 72 into electrical signals for use by electronic circuits. If a receiver/transmitter unit 74A or 74B wishes to transmit signals, its transmitter changes electronic signals into optical signals in the first or second polarization state, which signals are sent to the polarization combiner 73. The combiner 73 combines the optical signals from the two connected transmitters of the units 74A and 74B in the two polarization states and passes these optical signals to the WDM multiplexer 51. Hence in this embodiment polarization discrimination is performed at the user level.

Figure 5C:
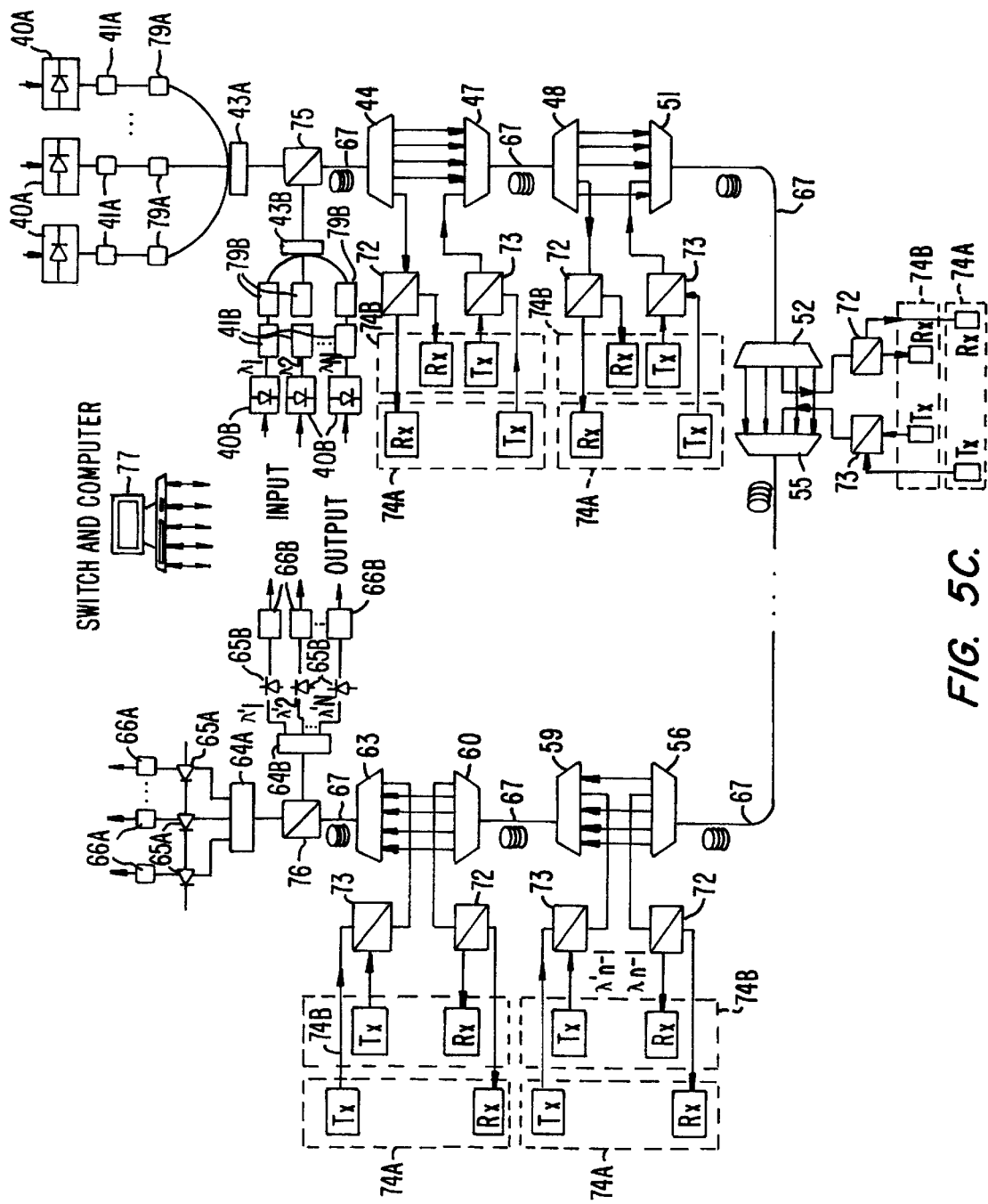
FIG. 5C is a block diagram of another variation of PDM/WDM ring network according to the present invention.

A variation of the FIG. 5B network is illustrated in FIG. 5C in which the number of communication channels is increased to match the increased number of users on the ring network. Rather than N laser sources 40, the FIG. 5C network has 2N laser sources, which are divided into two sets of N sources 40A and 40B. Each laser source 40A(B) at one of the output wavelengths, $\lambda_1-\lambda_N$, has its output intensity controlled by an attenuator 41A(B). Then the output of the laser source 40A(B) is placed into a first (second) state of polarization by a polarization controller 79A(B). The output at all the different wavelengths, $\lambda_1-\lambda_N$, of set A(B) is combined by a WDM multiplexer 43A(B) and sent to a polarization combiner 75 which passes the optical signals at the different wavelengths and the two states of polarization from both sets A and B to the optical fiber 67. The add/drop nodes and the receiver/transmitter units 74A and 74B of the ring network operate as described with respect to the FIG. 5B network. For each receiver/transmitter unit 74A(B), there is a corresponding laser source 40A(B) Like reference characters in FIGS. 4, 5B, and 5C represent like elements.

Likewise, for each receiver/transmitter unit 74A(B), there is a corresponding receiver, a photodiode 65A(B) and electrical unit 66A(B), to communicate with the switch/computer 77 of the network. Signals at the different wavelengths, $\lambda_1-\lambda_N$, and the two polarization states on the optical fiber 67 are received by a polarization divider 76 which separates signals according to the state of polarization. Signals in the first(second) polarization state are sent to a WDM demultiplexer 64A(B). The WDM demultiplexer 64A(B) separates signals according to wavelength. The optical signals at each wavelength, $\lambda_1-\lambda_N$, excite a photodiode 65A(B) which sends corresponding electrical signals to one of the electrical units 66A(B). The results is that there is one communication channel defined by wavelength and polarization state for each receiver/transmitter unit 74A and 74B, i.e., each user of the network. Bandwidth is increased to match the increase in the number of network users.

Figure 6:
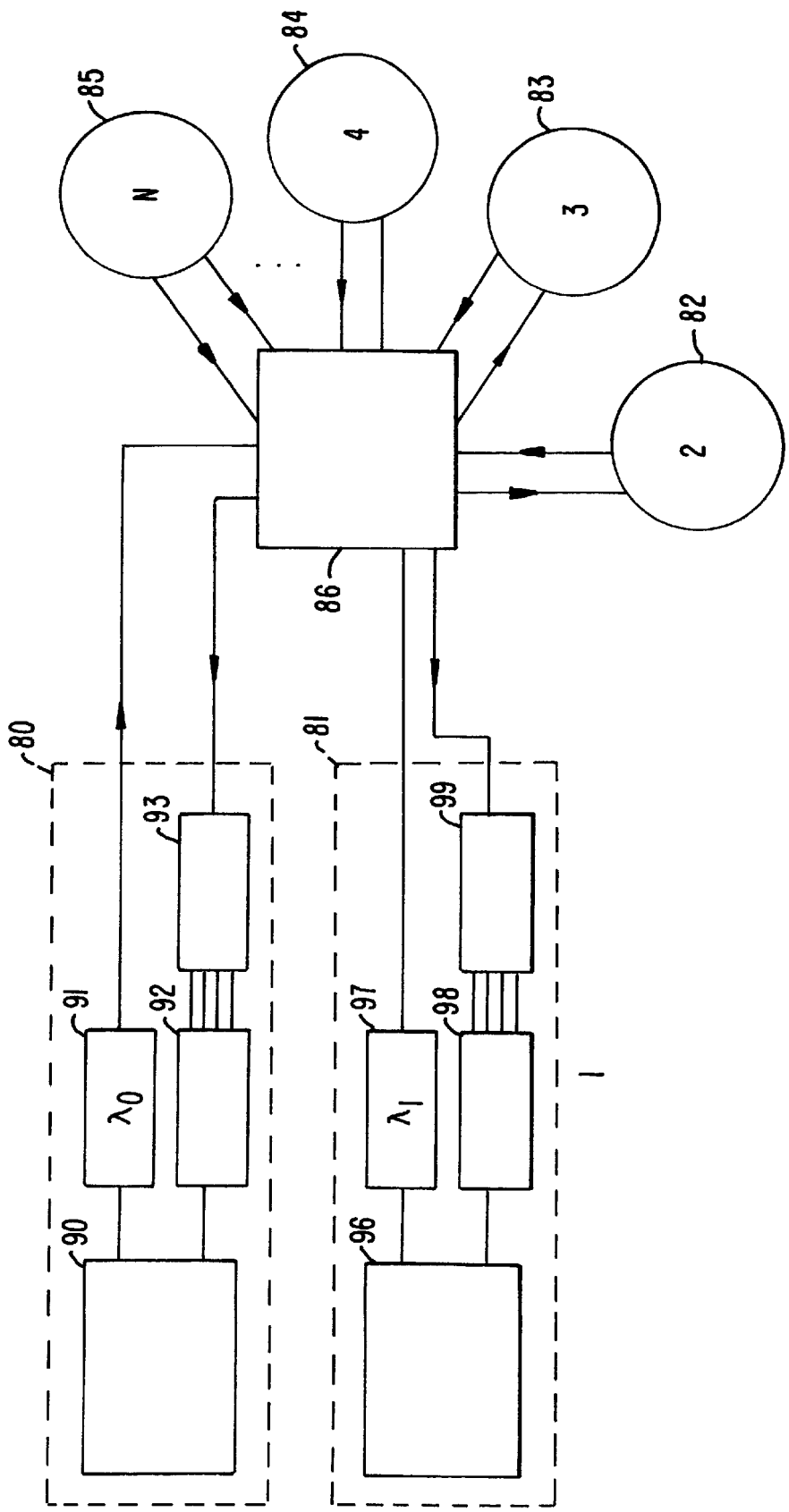
FIG. 6 is a block diagram of a conventional WDM star network.

A conventional fiberoptic star network is illustrated in FIG. 6. In this network system, an N×N star coupler 86 connected to N nodes 80–85. Each node operates with one of N optical wavelengths, $\lambda_1-\lambda_N$. Each node 80–85 has a laser source (91 and 97 in nodes 80 and 81 respectively) for transmitting light at the node's particular wavelength to the star coupler 86. The star coupler 86 broadcasts any optical signals from one node to all the other nodes of the network system. Each node has a WDM demultiplexer (93 and 99 in nodes 80 and 81 respectively) which receives signals from the star coupler 86 and separates the signals by their wavelengths. The separated optical signals are sent to a receiver (92 and 98 in nodes 80 and 81 respectively), which translates the received optical signals into electrical signals. The electrical signals are passed on to an electronic interface block (90 and 96 in nodes 80 and 81 respectively) which provides the interface for the electronic circuits of the network users. The electronic interface block determines whether the node is being addressed by one or more of the other nodes. The electronic interface block also provides the input signals for the laser source to send signals to the other nodes of the network.

One of the nodes, 80 in this example, acts as the central office of the network. Its electronic interface block 90 also comprises a switch and computer to administer the operations of the network and to provide access into, and egress from the star network.

Figure 7:
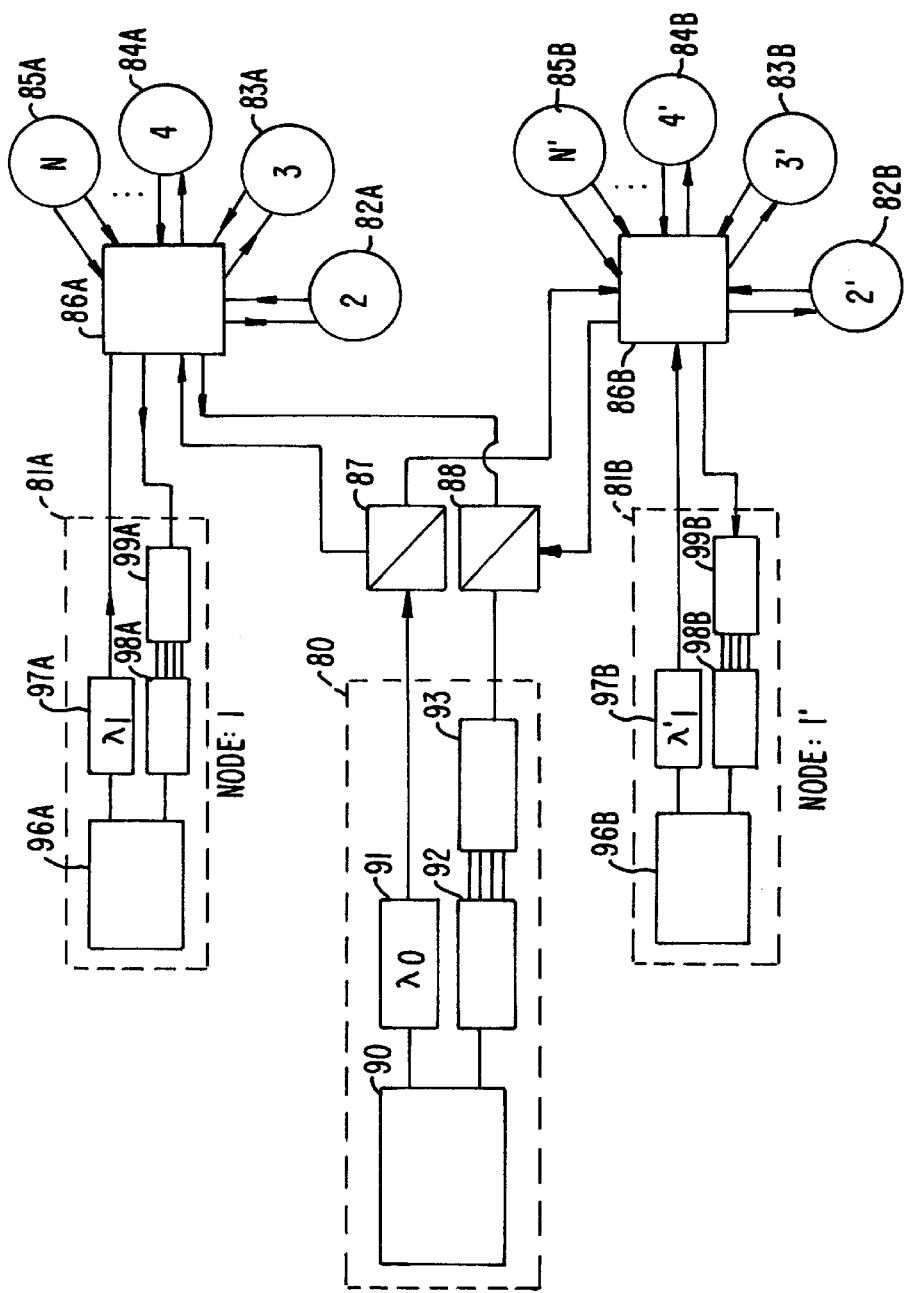
FIG. 7 is a block diagram of a dual polarization state PDM/WDM star network, according to an embodiment of the present invention.

The present invention is also readily adaptable to star networks. FIG. 7 shows still another embodiment of the present invention in which two star networks are connected to the same central office node 80. Each star network has an N×N star coupler 86A and 86B, which are each connected to N nodes 81A–85A and 81B–85B respectively. Each star coupler 86A and 86B is connected to the central office node 80 through a polarization divider 87 and a polarization combiner 88. The laser source 91 directs optical signals toward one star coupler 86A (and its set of nodes 81A–85A) or the other coupler 86B (and its set of nodes 81B–85B) by placing the optical signals in a first polarization state or a second polarization state. The polarization divider 87 sends optical signals from the laser source 91 to the star coupler 86A or 86B according to the state of polarization of the optical signals. The node 81A as shown includes an electronic interface block 96A, a laser source 97A, a receiver 98A, and a WDM demultiplexer 99A; while the node 81B includes an electronic interface block 96B, a laser source 97B, a receiver 98B, and a WDM demultiplexer 99B.

The laser sources in the nodes 81A–85A likewise generate optical signals in the first polarization state and the laser sources in the nodes 81B–85B generate optical signals in the second polarization state. The polarization combiner 88 transmits optical signals at all wavelengths $\lambda_0-\lambda_N$ in the first polarization state from the star coupler 86A to the receiver 92 of the node 80. Similarly, the polarization combiner 88 transmits optical signals at all wavelengths $\lambda_0-\lambda_N$ in the second polarization state from the star coupler 86B to the receiver 92. If a user at a node in the network emanating from the star coupler 86B wishes to send a message to a user at a node in the other network emanating from the star coupler 86A, the transmitting node places an electronic address of the second node in the transmitted optical signals. The receiver 92 at the central office node 80 receives these optical signals in the second polarization state and translates the optical signals into electronic ones. From the electronic address contained in the message, the switch, computer and electronic interface block 90 determines that the addressed node is in the star network of the coupler 86A. The message is translated back into optical signals in the first polarization state by the laser source 91 so that the optical signals are passed to the star coupler 86A which sends the optical signals to all the nodes 81A–85A. Upon determining the electronic address of the message, one or more of the nodes attached to the coupler 86A recognizes the address and accepts the message.

Figure 8:
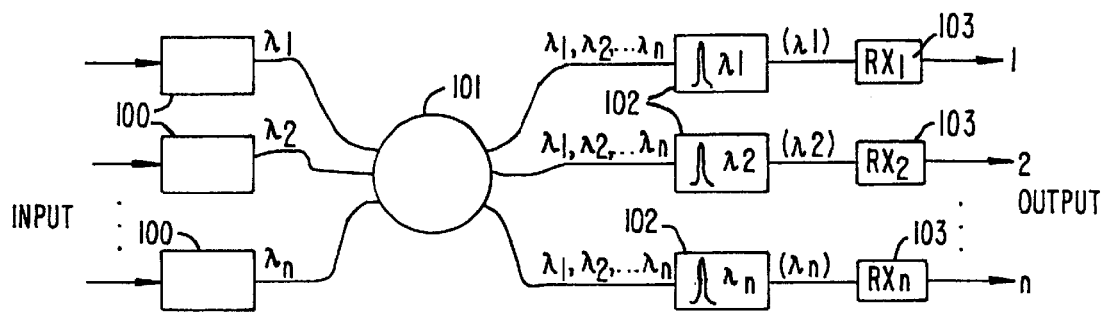
FIG. 8 is a block diagram of a conventional WDM photonic switch using wavelength tunable filters.

FIG. 8 illustrates a photonic switch network in which wavelength tunable filters are used to achieve wavelength division multiple access (WDMA). In this conventional network an N×N star coupler 101 is connected to a set of N laser sources 100, each generating optical signals at one of N wavelengths, $\lambda_1-\lambda_N$. The star coupler 101 is also connected to a set of N receivers 103 through N wavelength tunable filters 102. The star coupler 101 passes the signals at all wavelengths, $\lambda_1-\lambda_N$, to all of the receivers 103. A wavelength tunable filter 102 selects one of the wavelengths to pass on to its corresponding receiver 103. Any receiver 103 can receive optical signals at any wavelength depending upon the wavelength selection by its wavelength tunable filter 102. Each receiver 103 can receive signals from any of the laser sources 101 since each filter 102 is tunable. The operational configuration of this switch network is flexible.

According to the present invention, the number of receivers can be multiplied from the conventional photonic switch network of FIG. 8. The photonic switch systems of both FIGS. 9A and 9B have N laser sources 100, each generating signals at one of N wavelengths. The output of all these laser sources 100 are sent to a polarization divider 104, which directs the optical signals toward a first 1×N coupler 101A or a second 1×N coupler 101B, according to the polarization state of the signals. Hence, the laser sources 100 control the polarization state of their output signals according to which coupler 101A or 101B the output signals are to be directed. Each coupler 101A and 101B is connected to N receivers 103A and 103B respectively. At this point of the network, the two networks diverge.

Figure 9A:
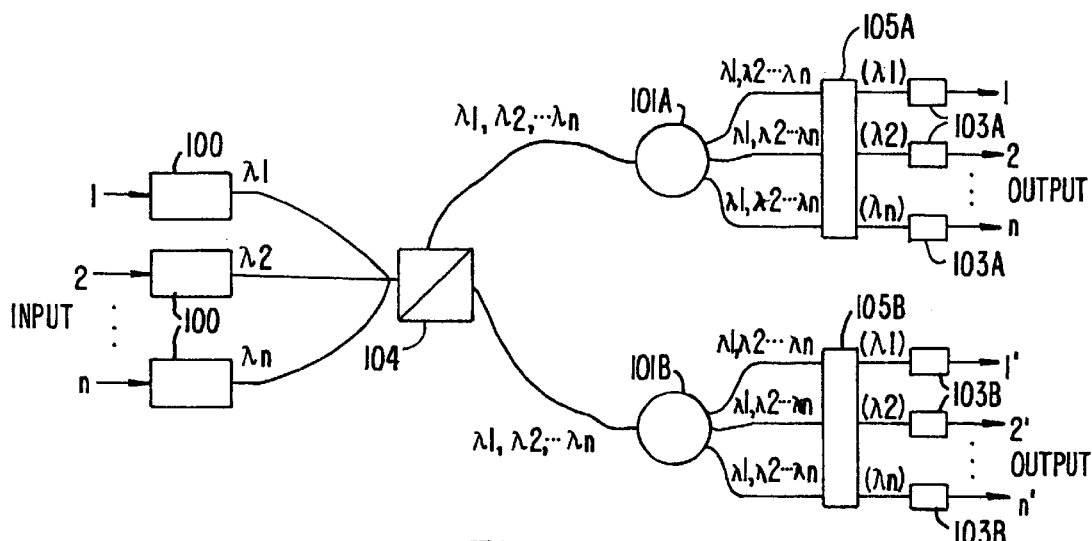
FIG. 9A is a block diagram of a PDM-WDM photonic switch using WDM multiplexers, according to an embodiment of the present invention.
Figure 9B:
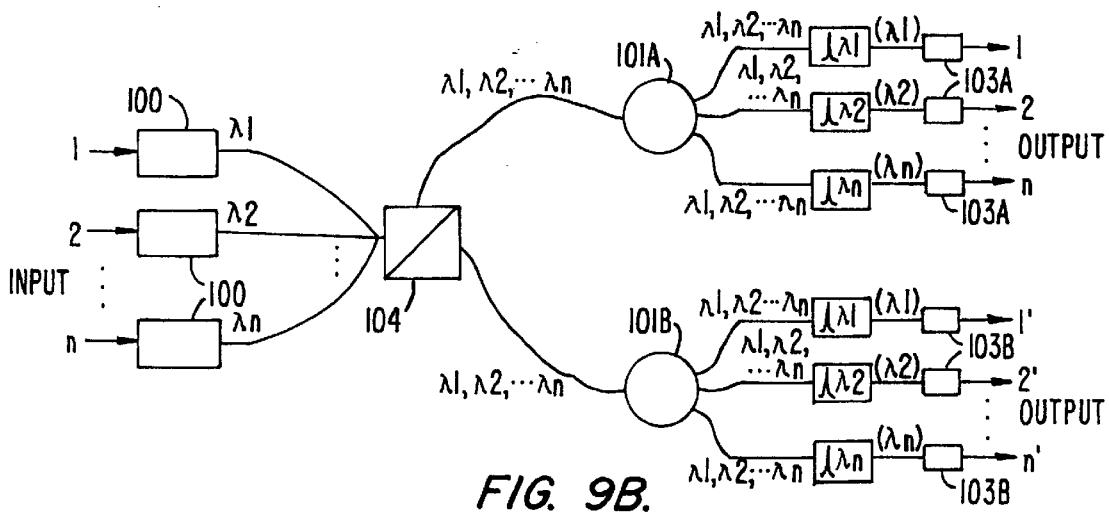
FIG. 9B is a block diagram of a PDM-WDM photonic switch using wavelength filters, according to another embodiment of the present invention.

In the FIG. 9A network, a WDM demultiplexer 105A is connected between the coupler 101A and the receivers 103A, and a second WDM demultiplexer 105B is connected between the coupler 101B and the receivers 103B. Each WDM demultiplexer 105A and 105B separates the signals at the N wavelengths, $\lambda_1-\lambda_N$, and transmits signals at each wavelength to one of the receivers 103A or 103B. The FIG. 9B network is similar to the conventional network of FIG. 8. Tunable wavelength filters 102A (and 102B) are connected between the receivers 103A (and 103B) and the 1×N coupler 101A (and 101B). Each of the receivers 103A (and 103B) receives a signal at a particular wavelength as determined by its corresponding filter 102A (or 102B). Since the filters 102A and 102B are tunable, the network of FIG. 9B is more flexible than the FIG. 9A network.

FIG. 10A illustrates the organization of a fiberoptic data bus network which operates conventionally with multiple wavelengths. In this example, there are eight network interface units 125 which communicate over an optical fiber 106. Sixteen wavelengths, $\lambda_1-\lambda_{16}$, are used in this network. Each network interface unit 125, by which a user communicates over the network, has two transmitters of fixed wavelength and two receivers of fixed wavelength. The drawing illustrates the wavelengths associated with each network interface unit 125. Each network interface unit 125 listens for signals at its two particular input wavelengths and passes the signals back to the fiber 106 at the unit's two output wavelengths if the unit is not the ultimate destination for the signals. Signals from one user at a first network interface unit reach a second user connected to a second network interface unit within three or less passes over the network fiber 106. For example, if the user connected to Network Interface Unit 1 wishes to communicate a message to the user connected to Network Interface Unit 7, the Network Interface Unit 1 transmits the message at wavelength $\lambda_1$. Network Interface Unit 5 receives the message and relays the message at wavelength $\lambda_{10}$. This message at wavelength $\lambda_{10}$ is received by Network Interface Unit 2, which then relays the message at wavelength $\lambda_3$. This message is received by the Network Interface Unit 7 and its connected user. Hence the message reaches the intended destination in three passes through the network fiber 106.

FIG. 10B symbolically illustrates a modification of the FIG. 10A network according to the present invention. Each network interface unit 107 has been modified from the network interface unit 125 of FIG. 10A so that each unit 107 is connected to two users. Each unit 107 transmits signals at two fixed wavelengths with two polarization states for each wavelength. Likewise, each unit 107 receives signals at two fixed wavelengths with two polarization states. The wavelengths, transmitting and receiving, for each unit 107 is the same as the conventional system of FIG. 10A. Polarization dividers 108 symbolically show the transmission of signals of one wavelength in two possible polarization states by each network interface unit 107, and polarization combiners 109 symbolically show the reception of signals of one wavelength in two possible polarization states.

With the use of the polarization states, the performance of the data bus network may be enhanced. The number of users on the network may be doubled, with two users connected to each network interface unit 107 with the unit discriminating between messages to the two connected users. Perhaps a simpler way of viewing this arrangement is to simply consider double the number of units 107 connected to the fiber 106 with each unit 107 connected to a user. Of course, in this simpler arrangement, the wavelengths and polarization states may be distributed independently. In any case, the performance is the same as that of the FIG. 10A conventional system.

Figure 10C:
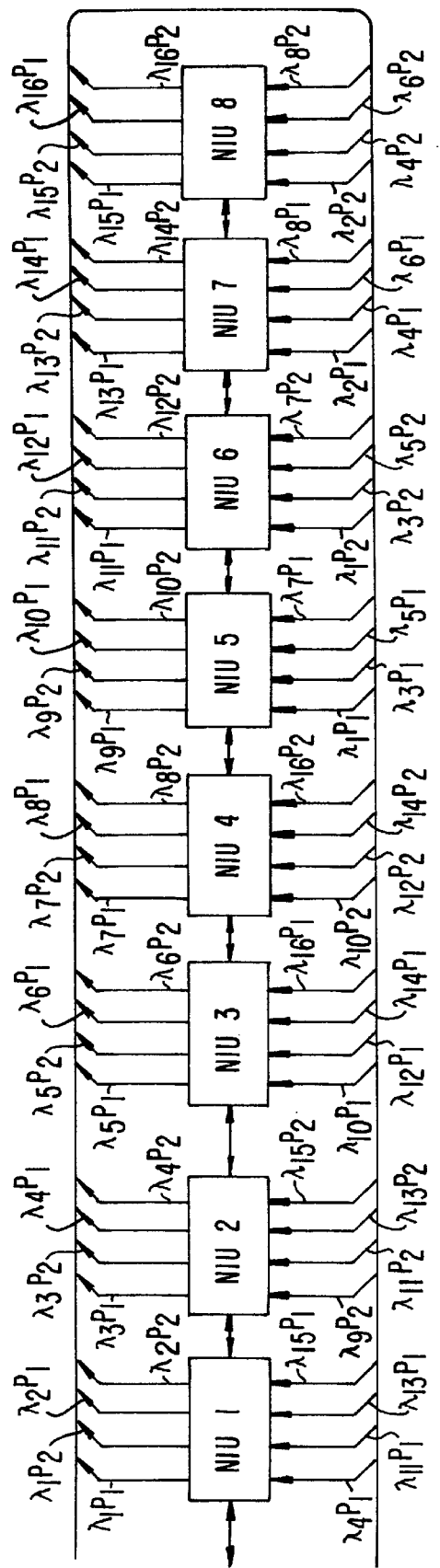

Alternatively, if the number of connected users is kept the same, and the distribution of polarization states and wavelengths were made independently of each other to the network interface units 107, performance would be enhanced. That is, a unit 107 is assigned the right to transmit signals at wavelength $\lambda_1$ in the first polarization state, and another unit may be assigned the transmission rights to wavelength $\lambda_1$ in the second polarization state, and so on. FIG. 10C illustrates one such arrangement. In this manner, the maximum number of passes through the optical fiber 106 for a message to reach one user from another user is significantly reduced over the conventional system of FIG. 10A.

Figure 11A:
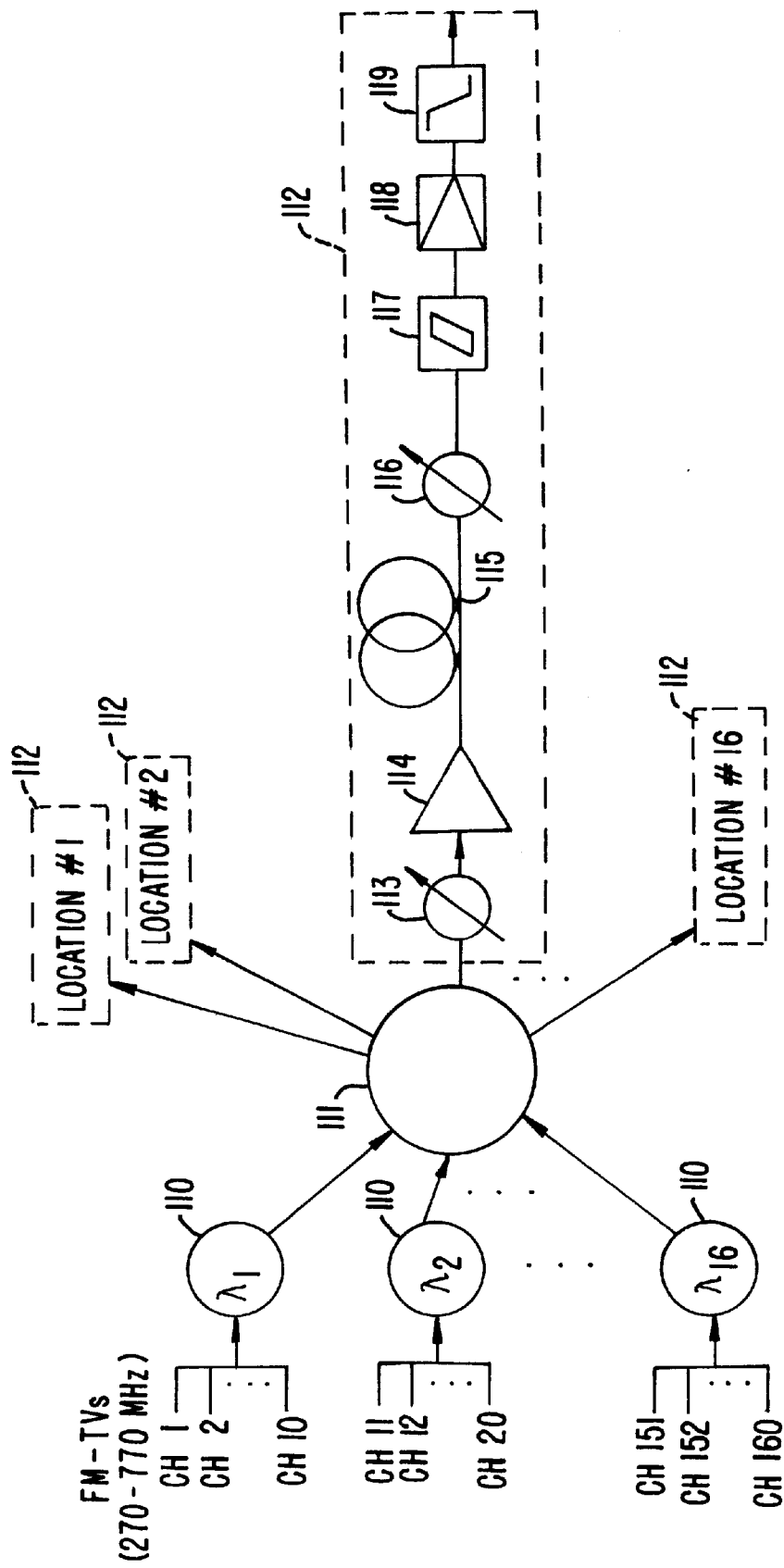
FIG. 11A is a block diagram of a conventional FM-video transmission system.

FIG. 11A is a block level diagram of an exemplary fiberoptic network for FM-video transmission. Such networks are being installed in many cable TV operations to the home in anticipation of the merging of television, computer, telephone and FM radio functions in the home. In the illustrated system, 160 channels for FM and television broadcast are sent to sixteen locations 112. Sixteen laser sources 110, each having a specific output wavelength, $\lambda_1-\lambda_{16}$, are each modulated by 10 FM and television broadcast sources. The laser sources 110 are connected to a 16×16 star coupler 111 which, in turn, has its output ports connected to the sixteen locations 112. Each location 112 from the output port of the coupler 111 has an adjustable input attenuator 113, an erbium-doped fiber amplifier 114, a length of single mode optical fiber 115 laid to the desired physical destination, an output attenuator 116, an angle-tuned etalon filter for frequency (wavelength) discrimination 117, a photodiode receiver 118 and a FM-video receiver 119.

Each broadcast source operates at a particular frequency, say, 270–770 MHz. Ten sources modulate the light signals of one of the laser sources 110 having a particular output wavelength. The star coupler 111 receives the optical signals of all sixteen laser sources 110 and transmits these signals to all sixteen locations 112. At each location 112, the optical signals are boosted by the erbium-doped fiber amplifier 114. The adjustable input attenuator 113 controls the optical signal intensity to the amplifier 114 for its optimum operation. The length of the optical fiber 115 carries the boosted optical signals to the destination of the particular location 112. The angle-tuned etalon filter 117, the photodiode receiver 118, and the FM-video receiver 119 operate to select the desired broadcast source. The output attenuator 116 conditions the optical signals on the fiber 115 and the filter 117 selects the one of the wavelengths, $\lambda_1$–$\lambda_{16}$. Stated differently, the filter 117 selects the signals from one of the laser sources 110. The filtered optical signals are then translated into electrical signals by the photodiode receiver 118 and the electrical signals are passed to the FM-video receiver 119. The receiver 119 selects the particular broadcast source, 1 of 10, being carried by the laser source 110 selected by the filter 117.

Figure 11B:
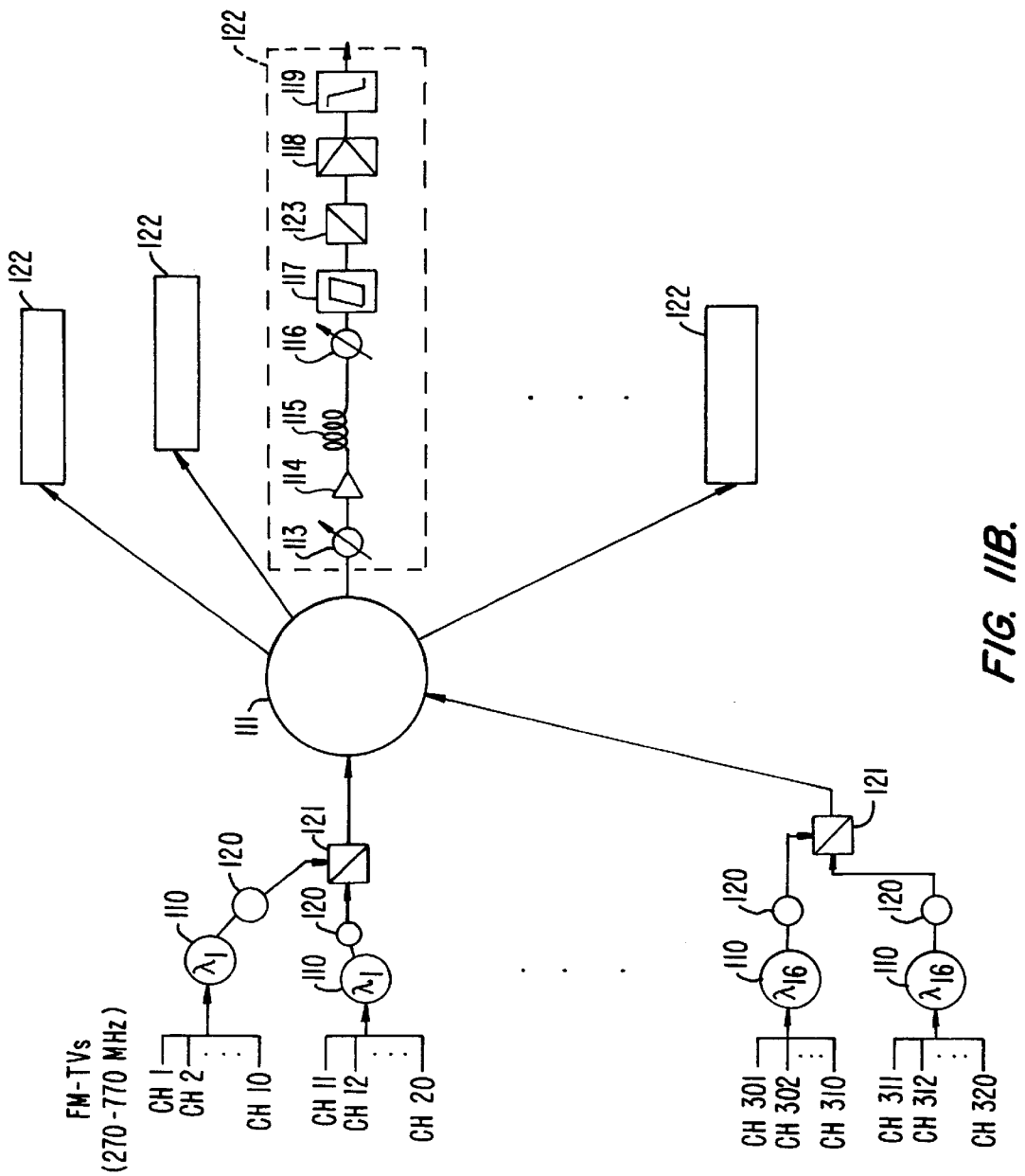
FIG. 11B is a block diagram of a PDM/WDM video transmission system, according to another embodiment of the present invention.

With the present invention, the number of broadcast channels can be effectively doubled. As illustrated in FIG. 11B, each laser source 110 at a particular wavelength, $\lambda_1$–$\lambda_{16}$, and modulated by the broadcast signals of ten sources, has the polarization of its output signal controlled by a polarization controller 120. Hence, in the specific embodiment shown, two lasers 110 have the same output wavelength, but are placed into two different polarization states by the controllers 120. The output from these controllers 120 are combined by polarization combiners 121 and the output of each combiner 121 is sent to the 16×16 star coupler 111. Two laser sources 110 are connect to each input port of the star coupler 111. The star coupler 111 sends the signals from the thirty-two laser sources 110 to each of sixteen receiving locations 122.

Each receiving location 122 is similar to the receiving locations 112 in FIG. 11A network. Besides the adjustable input attenuator 113, erbium-doped fiber amplifier 114, optical fiber 115, output attenuator 116, angle-tuned etalon filter 117, photodiode receiver 118, and the FM-video receiver 119, the location 122 has a polarization divider 123 to select the optical signals by their polarization states. The angle-tuned etalon filter 117 selects the optical signals by a particular wavelength, $\lambda_1$–$\lambda_{16}$, and the polarization divider 123 selects the particular laser source 110 at the wavelength. The photodiode receiver 118 and FM-video receiver 119 then select the particular channel modulating that laser source 110. Hence systems handling 320 broadcast channels can be easily constructed from conventional fiberoptic network for FM-video transmission.

Thus it should be evident that the present invention has many advantages. It can be easily adapted from existing technology and devices. Hence the costs of constructing such fiberoptic networks would be comparatively low for the gain in increased performance.

While the description above provides a full and complete disclosure of the preferred embodiments of the present invention, various modifications, alternate constructions, and equivalents will be obvious to those with skill in the art. For example, while the network systems with two polarization states were disclosed, it should be evident that systems with more than two polarization states would also have the increased performance envisioned by the present invention. Thus, the scope of the present invention is limited solely by the metes and bounds of the appended claims.

What is claimed is:

1. A PDM-WDM fiberoptic network system comprising
    a plurality of sets of laser sources, each laser source of a set responsive to electrical signals generating optical signals at one of a plurality of wavelengths and at one of a plurality of polarization states, each polarization state corresponding to one set of said laser sources;
    a plurality of WDM multiplexers, each WDM multiplexer having a plurality of inputs and an output, said plurality of inputs of the WDM multiplexer connected to outputs of a set of said laser sources;
    a polarization combiner having a plurality of inputs and an output, each input of the polarization combiner connected to one of said outputs of said WDM multiplexers, said combiner combining optical signals from said inputs of the polarization combiner to said output of the polarization combiner;
    an optical fiber having a first end and a second end, said first end connected to said output of said polarization combiner;
    a polarization divider having an input and a plurality of outputs, said input of the polarization divider connected to said second end of said optical fiber, said polarization divider separating optical signals from said input of the polarization divider to one of said outputs of the polarization divider corresponding to one of said polarization states;
    a plurality of WDM demultiplexers, each WDM demultiplexer having an input and a plurality of outputs, said input of the WDM demultiplexer connected to one of said plurality of outputs of said polarization divider, each WDM demultiplexer separating optical signals from said input of the WDM demultiplexer to one of said outputs of the WDM demultiplexer corresponding to one of said wavelengths;
    a plurality of receivers, each receiver having an input connected to one of said outputs of one of said WDM demultiplexers to receive optical signals at one of a plurality of wavelengths and at one of a plurality of polarization states; and
    an endless polarization controller connected between said second end of said optical fiber and said input of said polarization divider; and polarization auto-tracking electronics having an input connected to an output of one of said WDM demultiplexers and an output connected to said endless polarization controller.

2. The PDM-WDM fiberoptic network system of claim 1 wherein each of said laser sources comprises
    a laser diode generating optical signals of one of said plurality of wavelengths;
    a polarization controller, each polarization controller having an input connected to an output of one of said plurality of said laser diodes and maintaining optical signals from said one of said laser diodes in a polarization state corresponding to said set of said laser source.

3. The PDM-WDM fiberoptic network system of claim 2 wherein each of said laser sources comprises
    a variable attenuator connected between said laser diode and said polarization controller, said variable attenuator controlling optical signal strength from said laser diode.

4. The PDM-WDM fiberoptic network system of claim 1 wherein each of said plurality of sets of laser sources corresponds to one of two polarization states.

5. The PDM-WDM fiberoptic network system of claim 1 wherein at least one of said plurality of sets of laser sources is directly modulated by electrical signals.

6. The PDM-WDM fiberoptic network system of claim 1 wherein at least one of said plurality of sets of laser sources has an output modulated by electrical signals.

7. The PDM-WDM fiberoptic network system of claim 1 wherein at least one of said plurality of receivers comprises a photodiode receiving optical signals and converting said optical signals into electrical signals, and an electronic unit receiving said electrical signals and conditioning said electrical signals for operation in electronic circuits.

8. The PDM-WDM fiberoptic network system of claim 1 wherein each of said plurality of sets of laser sources corresponds to one of only two polarization states.

9. A fiberoptic receiving system comprising:
a demultiplexer connected to a transmission fiber carrying light signals at specific wavelengths and specific polarization states, said demultiplexer separating said signals responsive to specific wavelength and specific polarization state;
a plurality of signal receivers connected to said demultiplexer, each signal receiver receiving light signals at a specific wavelength and a specific polarization state; and
an endless polarization controller connected between said transmission fiber and said polarization divider and polarization auto-tracking electronics connected between one of said plurality of WDM demultiplexers and said endless polarization controller, said polarization auto-tracking electronics locking into one of said specific polarization states corresponding to said one of said WDM demultiplexers, said endless polarization controller rotating polarization of said light signals from said transmission fiber according to said one of said specific polarization states.

10. The fiberoptic receiving system of claim 9 wherein each signal receiver comprises a photodiode receiving light signals and converting said light signals into electrical signals; and an electronic unit receiving said electrical signals and conditioning said electrical signals for operation in electronic circuits.

11. The fiberoptic receiving system of claim 9 wherein said demultiplexer comprises a polarization divider separating said light signals into a plurality of sets of light signals according to said specific polarization states and a plurality of WDM demultiplexers each separating one of said sets of light signals according to said specific wavelengths.

12. The fiberoptic receiving system of claim 9 wherein each of said plurality of signal receivers corresponds to one of only two polarization states.

13. A PDM-WDM fiberoptic ring network system comprising:
a plurality of laser sources each responsive to electrical signals generating optical signals at one of a plurality of wavelengths;
a plurality of polarization controllers, each polarization controller having an input connected to an output of one of said plurality of said laser sources and rotating said optical signals from said one of said plurality of said laser sources according to a plurality of polarization states;
a WDM multiplexer having a plurality of inputs and an output, said plurality of inputs of the WDM multiplexer connected to outputs of said polarization controllers;
a polarization divider having an input connected to said output of said WDM multiplexer and having a plurality of outputs, said polarization divider separating optical signals from said input of the polarization divider to one of said outputs of the polarization divider corresponding to one of said polarization states;
a plurality of optical fibers, each optical fiber having a first end and a second end, said first end connected to one of said outputs of said polarization divider for receiving optical signals at one of said polarization states, each optical fiber having a plurality of add/drop nodes connected in series therein, each add/drop node providing access to said optical signals at one of said plurality of wavelengths;
a polarization combiner having a plurality of inputs and an output, each input of the polarization combiner connected to said second end of one of said plurality of said optical fibers;
a WDM demultiplexer having an input and a plurality of outputs, said input of the WDM demultiplexer connected to said output of said polarization combiner and separating optical signals from said input of the WDM demultiplexer to one of said outputs of the WDM demultiplexer corresponding to one of said wavelengths; and
a plurality of receivers, each receiver having an input connected to one of said plurality of outputs of said WDM demultiplexer to receive optical signals at one of said plurality of wavelengths and at said plurality of polarization states.

14. The PDM-WDM fiberoptic ring network system of claim 13, wherein each of said laser sources comprises a laser diode generating optical signals of one of said plurality of wavelengths; and a variable attenuator connected between said laser diode and said polarization controller, said variable attenuator controlling optical signal strength from said laser diode.

15. The PDM-WDM fiberoptic ring network system of claim 13 wherein each add/drop node includes a WDM demultiplexer having an input connected to said optical fiber and a plurality of outputs, said WDM demultiplexer separating optical signals from said input of the WDM demultiplexer to one of said outputs of the WDM demultiplexer corresponding to one of said plurality of wavelengths; a receiver having an input connected to one of said outputs of said WDM demultiplexer to receive optical signals at a preselected wavelength and polarization state unique to said drop-add node, said receiver converting said received optical signals into electrical signals; a transmitter responsive to said electrical signals generating optical signals at said preselected wavelength; and a WDM multiplexer having a plurality of inputs and an output, said plurality of inputs of the WDM multiplexer connected to an output of said transmitter and remaining outputs of said WDM demultiplexer, said output of the WDM multiplexer connected to said optical fiber.

16. The PDM-WDM fiberoptic ring network system of claim 15 wherein said receiver comprises a photodiode converting said optical signals into said electrical signals; and an electronic unit receiving said electrical signals and conditioning said electrical signals for operation in electronic circuits.

17. The PDM-WDM fiberoptic ring network system of claim 13 wherein said plurality of polarization controllers rotate said optical signals according to two polarization states.

18. A PDM-WDM fiberoptic ring network system comprising:
a plurality of laser sources each responsive to electrical signals generating optical signals at one of a plurality of wavelengths;
a plurality of polarization controllers, each polarization controller having an input connected to an output of one of said plurality of said laser sources and rotating said optical signals from said one of said laser sources according to a plurality of polarization states;
a multiplexer having a plurality of inputs connected to outputs of said polarization controllers and having an output;
an optical fiber having a first end and a second end, said first end connected to said output of said multiplexer for receiving optical signals from said multiplexer, said optical fiber having a plurality of add/drop nodes connected in series therein, each add/drop node providing access to said optical signals at said polarization states and a preselected wavelength unique to said add/drop node;

a demultiplexer having an input and a plurality of outputs, said input of the demultiplexer connected to said second end of said optical fiber; and a plurality of receivers, each receiver having an input connected to one of said plurality of outputs of said demultiplexer to receive optical signals at one of said plurality of wavelengths and at said plurality of polarization states;

wherein each add/drop node includes a WDM demultiplexer having an input connected to said optical fiber and a plurality of outputs, said WDM demultiplexer separating optical signals from said input of the WDM demultiplexer to one of said outputs of the WDM demultiplexer corresponding to one of said plurality of wavelengths; a polarization divider having an input and a plurality of outputs, said input of the polarization divider connected to one of said outputs of said WDM demultiplexer separating optical signals from said input of the polarization divider to one of said outputs of the polarization divider corresponding to one of said polarization states; a plurality of receivers, each receiver having an input connected to one of said outputs of said polarization divider to receive optical signals at one of said polarization states and at said preselected wavelength unique to said add/drop node, said receiver converting said optical signals into electrical signals; a plurality of transmitters, each transmitter responsive to said electrical signals of one of said plurality of said receivers generating optical signals at one of said polarization states and at said preselected wavelength; a polarization combiner having a plurality of inputs and an output, each input of the polarization combiner connected to an output of one of said plurality of transmitters to combine optical signals from said inputs of the polarization combiner to said output of the polarization combiner; and a WDM multiplexer having a plurality of inputs and an output, said plurality of inputs of the WDM multiplexer connected to said output of said polarization combiner and remaining outputs of said WDM demultiplexer, said output of the WDM multiplexer connected to said optical fiber.

19. The PDM-WDM fiberoptic ring network system of claim 18, wherein each of said laser sources comprises a laser diode generating optical signals of one of said plurality of wavelengths; and a variable attenuator connected between said laser diode and said polarization controller, said variable attenuator controlling optical signal strength from said laser diode.

20. The PDM-WDM fiberoptic ring network system of claim 18 wherein each of said plurality of said receivers comprises a photodiode converting said optical signals into said electrical signals; and an electronic unit receiving said electrical signals and conditioning said electrical signals for operation in electronic circuits.

21. The PDM-WDM fiberoptic ring network system of claim 18 wherein said plurality of polarization controllers rotate said optical signals according to two polarization states.

22. The PDM-WDM fiberoptic ring network system of claim 18 wherein said multiplexer comprises a WDM multiplexer.

23. The PDM-WDM fiberoptic ring network system of claim 18 wherein said multiplexer comprises a plurality of WDM multiplexers, each WDM multiplexer having a plurality of inputs and an output, said plurality of inputs of the WDM multiplexer connected to outputs of a set of said polarization controllers which maintain optical signals in one of said plurality of polarization states; and a polarization combiner having a plurality of inputs and an output, each input of the polarization combiner connected to one of said outputs of said WDM multiplexers, said combiner combining optical signals from said inputs of the polarization combiner to said output of the polarization combiner.

24. The PDM-WDM fiberoptic ring network system of claim 18 wherein said demultiplexer comprises a WDM demultiplexer.

25. The PDM-WDM fiberoptic ring network system of claim 18 wherein said demultiplexer comprises a polarization divider having an input and a plurality of outputs, said input of the polarization divider connected to said second end of said optical fiber to separate optical signals from said input of the polarization divider to one of said outputs of the polarization divider corresponding to one of said polarization state; and a plurality of WDM demultiplexers, each WDM demultiplexer having an input and a plurality of outputs, said input of the WDM demultiplexer connected to one of said plurality of outputs of said polarization divider to separate optical signals from said input of the WDM demultiplexer to one of said outputs of the WDM demultiplexer corresponding to one of said wavelengths.

26. A fiberoptic star network comprising:

a central office node having an input for receiving input optical signals and an output for transmitting output optical signals at a central office wavelength and selectively at any one of a plurality of polarization states;

a plurality of star couplers each corresponding to one of said plurality of polarization states, each star coupler having a plurality of inputs and outputs;

a polarization divider having an input connected to said output of said central office node and a plurality of outputs, each output of the polarization divider connected to an input of one of said plurality of said star couplers, said polarization divider separating optical signals from said input of the polarization divider to one of said outputs of the polarization divider corresponding to one of said polarization states;

a polarization combiner having an output connected to said input of said central office node and a plurality of inputs, each input of the polarization combiner connected to an output of one of said plurality of said star couplers, said polarization combiner combining optical signals from said inputs of the polarization combiner to said output of the polarization combiner; and a plurality of nodes, each node having an input receiving input optical signals and an output transmitting output optical signals at one of a plurality of nodal wavelengths and one of said plurality of polarization states, said output of each node connected to an input of one of said plurality of said star couplers corresponding to said one of said polarization states, said input of each node connected to an output of said one of said star couplers.

27. The fiberoptic star network of claim 26 wherein said central office node receives input optical signals and transmits output optical signals selectively in two polarization states.

28. The fiberoptic star network of claim 26 wherein said central office node includes a WDM demultiplexer separating said input optical signals according to said plurality of nodal and central office wavelengths;

a receiver converting said separated optical signals into electrical signals;

an electronic interface block responsive to said electrical signals generating input signals; and a laser source responsive to said input signals transmitting said output optical signals at said central office wavelength and in said selected polarization state.

29. The fiberoptic star network of claim 26 wherein each of said plurality of nodes includes a WDM demultiplexer separating said input optical signals according to said nodal and central office wavelengths;

a receiver converting said separated optical signals into electrical signals;

an electronic interface block responsive to said electrical signals generating input signals; and a laser source responsive to said input signals transmitting said output optical signals at one of said plurality of nodal wavelengths.

30. A photonic switch network comprising:

a plurality of laser sources, each laser source responsive to electrical signals generating optical signals at one of a plurality of wavelengths and selectively at any one of a plurality of polarization states;

a polarization divider having an input and a plurality of outputs, said input of the polarization divider connected to said plurality of laser sources and each of said plurality of outputs corresponding to one of said plurality of polarization states;

a plurality of star couplers each corresponding to one of said plurality of polarization states, each star coupler having a plurality of outputs and an input connected to an output of said polarization divider;

a plurality of sets of wavelength tunable filters, each wavelength tunable filter in one of said plurality of sets having an input connected to an output of one of said plurality of star couplers, each wavelength tunable filter having an output; and a plurality of receivers, each receiver having an input connected to said output of one of said plurality of said wavelength tunable filters to receive optical signals at one of a plurality of wavelengths and at one of a plurality of polarization states.

31. The photonic switch network of claim 30 wherein each of said plurality of laser sources generates selectively optical signals in one of two polarization states.

32. The photonic switch network of claim 30 wherein each of said plurality of laser sources generates selectively optical signals in one of only two polarization states.

33. A photonic switch network comprising:

a plurality of laser sources, each laser source responsive to electrical signals generating optical signals at one of a plurality of wavelengths and selectively at any one of a plurality of polarization states;

a polarization divider having an input connected to said plurality of laser sources and a plurality of outputs;

a plurality of star couplers each corresponding to one of said plurality of polarization states, each star coupler having a plurality of outputs and an input connected to an output of said polarization divider;

a plurality of WDM demultiplexers, each WDM demultiplexer having a plurality of outputs and a plurality of inputs, each input of the WDM demultiplexer connected to an output of one of said plurality of star couplers corresponding to one of said plurality of polarization states, said WDM demultiplexer separating optical signals from each input of the WDM demultiplexer to one of said outputs of the WDM demultiplexer corresponding to one of said wavelengths; and a plurality of receivers, each receiver having an input connected to an output of said WDM demultiplexer to receive optical signals at one of a plurality of wavelengths and at one of a plurality of polarization states.

34. The photonic switch network of claim 33 wherein each of said plurality of laser sources generates selectively optical signals in one of two polarization states.

35. The photonic switch network of claim 33 wherein each of said plurality of laser sources generates selectively optical signals in one of only two polarization states.

36. A fiberoptic data bus network comprising:

an optical fiber carrying optical signals at a plurality of wavelengths and in a plurality of polarization states; and a plurality of network interface units connected to said optical fiber, each network interface unit receiving input optical signals from said optical fiber at preselected wavelengths and polarization states unique to said network interface unit, each network interface unit transmitting output optical signals unto said optical fiber at preselected wavelengths and polarization states unique to said network interface unit.

37. The fiberoptic data bus network of claim 36 wherein each network interface unit receives input optical signals at two preselected wavelengths and two polarization states unique to said network interface unit.

38. The fiberoptic data bus network of claim 37 wherein each network interface unit transmits output optical signals at two preselected wavelengths and two polarization states unique to said network interface unit.

39. The fiberoptic data bus network of claim 38 wherein each network interface unit is connected to two users, one-half a combination of said two preselected wavelengths and two polarization states of said input optical signals and one-half a combination of said two preselected wavelengths and two polarization states of said output optical signals corresponding to each user.

40. A fiberoptic network for FM-video transmission comprising:

a plurality of laser sources, each laser source responsive to electrical signals from a plurality of channels generating optical signals at one of a plurality of wavelengths and one of a plurality of polarization states;

a plurality of polarization combiners, each polarization combiner having a plurality of inputs and an output, each input of the polarization combiner connected to one of said laser sources, each laser source at different polarization states, said polarization combiner combining optical signals from said inputs of the polarization combiner to said output of the polarization combiner;

a star coupler having a plurality of inputs and outputs, each input of the star coupler connected to said output of one of said plurality of polarization combiners; and a plurality of locations, each location having an input connected to one of said outputs of said star coupler to receive optical signals at said plurality of wavelengths and said plurality of polarization states.

41. The fiberoptic network of claim 40 wherein said plurality of laser sources generate optical signals in one of two polarization states.

42. The fiberoptic network of claim 40 wherein each of said laser sources comprises
- a laser diode generating optical signals of at said one of said plurality of wavelengths;
- a polarization controller, said polarization controller having an input connected to an output of said laser diode and maintaining optical signals from said laser diode in said one of said plurality of polarization states.

43. The fiberoptic network of claim 40 wherein each of said plurality of locations includes
- an adjustable input attenuator having an input connected to one of said outputs of said star coupler;
- an erbium-doped fiber amplifier having an input connected to an output of said adjustable input attenuator;
- an optical fiber having an input connected to an output of said erbium-doped fiber amplifier;
- an output attenuator having an input connected to an output of said optical fiber;
- an angle-tuned etalon filter having an input connected to an output of said output attenuator;
- a polarization divider having an input connected to an output of said angle-tuned etalon filter;
- a photodiode receiver having an input connected to an output of said polarization divider; and
- an FM-video receiver having an input connected to an output of said photodiode receiver.

44. A PDM-WDM fiberoptic ring network system comprising:
- a plurality of laser sources each responsive to electrical signals generating optical signals at one of a plurality of wavelengths;
- a plurality of polarization controllers, each polarization controller having an input connected to an output of one of said plurality of said laser sources and rotating said optical signals from said one of said plurality of said laser sources according to only two polarization states;
- a WDM multiplexer having a plurality of inputs and an output, said plurality of inputs of the WDM multiplexer connected to outputs of said polarization controllers;
- a polarization divider having an input connected to said output of said WDM multiplexer and having a plurality of outputs, said polarization divider separating optical signals from said input of the polarization divider to one of said outputs of the polarization divider corresponding to one of said polarization states;
- a plurality of optical fibers, each optical fiber having a first end and a second end, said first end connected to one of said outputs of said polarization divider for receiving optical signals at one of said polarization states, each optical fiber having a plurality of add/drop nodes connected in series therein, each add/drop node providing access to said optical signals at one of said plurality of wavelengths;
- a polarization combiner having a plurality of inputs and an output, each input of the polarization combiner connected to said second end of one of said plurality of said optical fibers;
- a WDM demultiplexer having an input and a plurality of outputs, said input of the WDM demultiplexer connected to said output of said polarization combiner and separating optical signals from said input of the WDM demultiplexer to one of said outputs of the WDM demultiplexer corresponding to one of said wavelengths; and
- a plurality of receivers, each receiver having an input connected to one of said plurality of outputs of said WDM demultiplexer to receive optical signals at one of said plurality of wavelengths and at said polarization states.

45. The PDM-WDM fiberoptic ring network system of claim 44, wherein each of said laser sources comprises a laser diode generating optical signals of one of said plurality of wavelengths; and a variable attenuator connected between said laser diode and said polarization controller, said variable attenuator controlling optical signal strength from said laser diode.

46. The PDM-WDM fiberoptic ring network system of claim 44 wherein each add/drop node includes a WDM demultiplexer having an input connected to said optical fiber and a plurality of outputs, said WDM demultiplexer separating optical signals from said input of the WDM demultiplexer to one of said outputs of the WDM demultiplexer corresponding to one of said plurality of wavelengths; a receiver having an input connected to one of said outputs of said WDM demultiplexer to receive optical signals at a preselected wavelength and polarization state unique to said drop-add node, said receiver converting said received optical signals into electrical signals; a transmitter responsive to said electrical signals generating optical signals at said preselected wavelength; and a WDM multiplexer having a plurality of inputs and an output, said plurality of inputs of the WDM multiplexer connected to an output of said transmitter and remaining outputs of said WDM demultiplexer, said output of the WDM multiplexer connected to said optical fiber.

47. The PDM-WDM fiberoptic ring network system of claim 46 wherein said receiver comprises a photodiode converting said optical signals into said electrical signals; and an electronic unit receiving said electrical signals and conditioning said electrical signals for operation in electronic circuits.

48. A PDM-WDM fiberoptic ring network system comprising:
- a plurality of laser sources each responsive to electrical signals generating optical signals at one of a plurality of wavelengths;
- a plurality of polarization controllers, each polarization controller having an input connected to an output of one of said plurality of said laser sources and rotating said optical signals from said one of said laser sources according to only two polarization states;
- a multiplexer having a plurality of inputs connected to outputs of said polarization controllers and having an output;
- an optical fiber having a first end and a second end, said first end connected to said output of said multiplexer for receiving optical signals from said multiplexer, said optical fiber having a plurality of add/drop nodes connected in series therein, each add/drop node providing access to said optical signals at said polarization states and a preselected wavelength unique to said add/drop node;
- a demultiplexer having an input and a plurality of outputs, said input of the demultiplexer connected to said second end of said optical fiber; and
- a plurality of receivers, each receiver having an input connected to one of said plurality of outputs of said demultiplexer to receive optical signals at one of said plurality of wavelengths and at said polarization states;
- wherein each add/drop node includes a WDM demultiplexer having an input connected to said optical fiber and a plurality of outputs, said WDM demultiplexer separating optical signals from said input of the WDM demultiplexer to one of said outputs of the WDM demultiplexer corresponding to one of said plurality of wavelengths; a polarization divider having an input and a plurality of outputs, said input of the polarization divider connected to one of said outputs of said WDM demultiplexer separating optical signals from said input of the polarization divider to one of said outputs of the polarization divider corresponding to one of said polarization states; a plurality of receivers, each receiver having an input connected to one of said outputs of said polarization divider to receive optical signals at one of said polarization states and at said preselected wavelength unique to said add/drop node, said receiver converting said optical signals into electrical signals; a plurality of transmitters, each transmitter responsive to said electrical signals of one of said plurality of said receivers generating optical signals at one of said polarization states and at said preselected wavelength; a polarization combiner having a plurality of inputs and an output, each input of the polarization combiner connected to an output of one of said plurality of transmitters to combine optical signals from said inputs of the polarization combiner to said output of the polarization combiner; and a WDM multiplexer having a plurality of inputs and an output, said plurality of inputs of the WDM multiplexer connected to said output of said polarization combiner and remaining outputs of said WDM demultiplexer, said output of the WDM multiplexer connected to said optical fiber.

49. The PDM-WDM fiberoptic ring network system of claim 48, wherein each of said laser sources comprises a laser diode generating optical signals of one of said plurality of wavelengths; and a variable attenuator connected between said laser diode and said polarization controller, said variable attenuator controlling optical signal strength from said laser diode.

50. The PDM-WDM fiberoptic ring network system of claim 48 wherein each of said plurality of said receivers comprises a photodiode converting said optical signals into said electrical signals; and an electronic unit receiving said electrical signals and conditioning said electrical signals for operation in electronic circuits.

51. The PDM-WDM fiberoptic ring network system of claim 48 wherein said multiplexer comprises a WDM multiplexer.

52. The PDM-WDM fiberoptic ring network system of claim 48 wherein said multiplexer comprises a plurality of WDM multiplexers, each WDM multiplexer having a plurality of inputs and an output, said plurality of inputs of the WDM multiplexer connected to outputs of a set of said polarization controllers which maintain optical signals in one of said polarization states; and a polarization combiner having a plurality of inputs and an output, each input of the polarization combiner connected to one of said outputs of said WDM multiplexers, said combiner combining optical signals from said inputs of the polarization combiner to said output of the polarization combiner.

53. The PDM-WDM fiberoptic ring network system of claim 48 wherein said demultiplexer comprises a WDM demultiplexer.

54. The PDM-WDM fiberoptic ring network system of claim 48 wherein said demultiplexer comprises a polarization divider having an input and a plurality of outputs, said input of the polarization divider connected to said second end of said optical fiber to separate optical signals from said input of the polarization divider to one of said outputs of the polarization divider corresponding to one of said polarization states; and a plurality of WDM demultiplexers, each WDM demultiplexer having an input and a plurality of outputs, said input of the WDM demultiplexer connected to one of said plurality of outputs of said polarization divider to separate optical signals from said input of the WDM demultiplexer to one of said outputs of the WDM demultiplexer corresponding to one of said wavelengths.

55. A fiberoptic star network comprising:

a central office node having an input for receiving input optical signals and an output for transmitting output optical signals at a central office wavelength and selectively at any one of only two polarization states;

a plurality of star couplers each corresponding to one of said polarization states, each star coupler having a plurality of inputs and outputs;

a polarization divider having an input connected to said output of said central office node and a plurality of outputs, each output of the polarization divider connected to an input of one of said plurality of said star couplers, said polarization divider separating optical signals from said input of the polarization divider to one of said outputs of the polarization divider corresponding to one of said polarization states;

a polarization combiner having an output connected to said input of said central office node and a plurality of inputs, each input of the polarization combiner connected to an output of one of said plurality of said star couplers, said polarization combiner combining optical signals from said inputs of the polarization combiner to said output of the polarization combiner; and a plurality of nodes, each node having an input receiving input optical signals and an output transmitting output optical signals at one of a plurality of nodal wavelengths and one of said polarization states, said output of each node connected to an input of one of said plurality of said star couplers corresponding to said one of said polarization states, said input of each node connected to an output of said one of said star couplers.

56. The fiberoptic star network of claim 55 wherein said central office node includes a WDM demultiplexer separating said input optical signals according to said plurality of nodal and central office wavelengths;

a receiver converting said separated optical signals into electrical signals;

an electronic interface block responsive to said electrical signals generating input signals; and a laser source responsive to said input signals transmitting said output optical signals at said central office wavelength and in said selected polarization state.

57. The fiberoptic star network of claim 55 wherein each of said plurality of nodes includes a WDM demultiplexer separating said input optical signals according to said nodal and central office wavelengths;

a receiver converting separated optical signals into electrical signals;

an electronic interface block responsive to said electrical signals generating input signals; and a laser source responsive to said input signals transmitting said output optical signals at one of said plurality of nodal wavelengths.

58. A fiberoptic data bus network comprising:

an optical fiber carrying optical signals at a plurality of wavelengths and in only two polarization states; and a plurality of network interface units connected to said optical fiber, each network interface unit receiving input optical signals from said optical fiber at preselected wavelengths and polarization states unique to said network interface unit, each network interface unit transmitting output optical signals unto said optical fiber at preselected wavelengths and polarization states unique to said network interface unit.

59. The fiberoptic data bus network of claim 58 wherein each network interface unit receives input optical signals at two preselected wavelengths and two polarization states unique to said network interface unit.

60. The fiberoptic data bus network of claim 59 wherein each network interface unit transmits output optical signals at two preselected wavelengths and two polarization states unique to said network interface unit.

61. The fiberoptic data bus network of claim 60 wherein each network interface unit is connected to two users, one-half a combination of said two preselected wavelengths and two polarization states of said input optical signals and one-half a combination of said two preselected wavelengths and two polarization states of said output optical signals corresponding to each user.

62. A fiberoptic network for FM-video transmission comprising:

a plurality of laser sources, each laser source responsive to electrical signals from a plurality of channels generating optical signals at one of a plurality of wavelengths and one of only two polarization states;

a plurality of polarization combiners, each polarization combiner having a plurality of inputs and an output, each input of the polarization combiner connected to one of said laser sources, each laser source at different polarization states, said polarization combiner combining optical signals from said inputs of the polarization combiner to said output of the polarization combiner;

a star coupler having a plurality of inputs and outputs, each input of the star coupler connected to said output of one of said plurality of polarization combiners; and a plurality of locations, each location having an input connected to one of said outputs of said star coupler to receive optical signals at said plurality of wavelengths and said polarization states.

63. The fiberoptic network of claim 62 wherein each of said laser sources comprises a laser diode generating optical signals of at said one of said plurality of wavelengths;

a polarization controller, said polarization controller having an input connected to an output of said laser diode and maintaining optical signals from said laser diode in said one of said polarization states.

64. The fiberoptic network of claim 62 wherein each of said plurality of locations includes an adjustable input attenuator having an input connected to one of said outputs of said star coupler;

an erbium-doped fiber amplifier having an input connected to an output of said adjustable input attenuator;

an optical fiber having an input connected to an output of said erbium-doped fiber amplifier;

an output attenuator having an input connected to an output of said optical fiber;

an angle-tuned etalon filter having an input connected to an output of said output attenuator;

a polarization divider having an input connected to an output of said angle-tuned etalon filter;

a photodiode receiver having an input connected to an output of said polarization divider; and an FM-video receiver having an input connected to an output of said photodiode receiver.

* * * * *